US009007878B2

(12) United States Patent
Matsumoto et al.

(10) Patent No.: US 9,007,878 B2
(45) Date of Patent: *Apr. 14, 2015

(54) GLASS FOR MAGNETIC RECORDING MEDIUM SUBSTRATE AND USAGE THEREOF

(71) Applicant: Hoya Corporation, Tokyo (JP)

(72) Inventors: Naomi Matsumoto, Shinjuku-ku (JP); Kazuaki Hashimoto, Shinjuku-ku (JP)

(73) Assignee: Hoya Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/341,142

(22) Filed: Jul. 25, 2014

(65) Prior Publication Data

US 2014/0334276 A1   Nov. 13, 2014

Related U.S. Application Data

(63) Continuation of application No. 13/890,866, filed on May 9, 2013, now Pat. No. 8,824,248.

(60) Provisional application No. 61/647,644, filed on May 16, 2012.

(51) Int. Cl.
*G11B 11/00* (2006.01)
*G11B 5/62* (2006.01)
(Continued)

(52) U.S. Cl.
CPC .............. *G11B 5/7315* (2013.01); *C03C 3/085* (2013.01); *C03C 3/087* (2013.01); *C03C 17/06* (2013.01);
(Continued)

(58) Field of Classification Search
CPC .... C03B 11/088; C03B 25/087; C03B 25/06; C03C 3/085; G11B 5/7315; G11B 11/10584; G11B 5/65; G11B 5/8404; B24B 37/042
USPC ............ 369/13.02, 13.24; 360/135; 65/30.14, 65/90; 428/141, 220, 410, 552, 573, 611, 428/432, 64.4; 501/66, 69, 70
See application file for complete search history.

(56) References Cited

U.S. PATENT DOCUMENTS 5,900,296 A   5/1999  Hayashi et al.
5,958,812 A   9/1999  Koch et al.
(Continued)

FOREIGN PATENT DOCUMENTS

CN   103189917 A   7/2013
JP   H09507206 A   7/1997
(Continued)

OTHER PUBLICATIONS

International Search Report and Search Opinion issed in corresponding PCT/JP2013/063046 dated Aug. 13, 2013.
(Continued)

*Primary Examiner* — Ali Neyzari
(74) *Attorney, Agent, or Firm* — Sughrue Mion, PLLC

(57) ABSTRACT

An aspect of the present invention relates to glass for a magnetic recording medium substrate, which includes essential components in the form of $SiO_2$, $Li_2O$, $Na_2O$, and one or more alkaline earth metal oxides selected from the group consisting of MgO, CaO, SrO, and BaO, wherein a molar ratio of a content of MgO to a combined content of MgO, CaO, SrO, and BaO (MgO/(MgO+CaO+SrO+BaO)) is equal to or greater than 0.80, and which has a Young's modulus of equal to or greater than 80 GPa, and a glass transition temperature of equal to or greater than 620° C.

20 Claims, 6 Drawing Sheets

(51) Int. Cl.
  *G11B 5/73* (2006.01)
  *C03C 3/085* (2006.01)
  *C03C 3/087* (2006.01)
  *C03C 17/06* (2006.01)
  *C03C 21/00* (2006.01)
  *G11B 5/84* (2006.01)
  *G11B 13/04* (2006.01)
  *G11B 5/00* (2006.01)

(52) U.S. Cl.
  CPC . *C03C 21/00* (2013.01); *G11B 5/73* (2013.01); *G11B 5/8404* (2013.01); *G11B 13/04* (2013.01); *G11B 2005/0021* (2013.01)

(56) References Cited

U.S. PATENT DOCUMENTS

| | | | |
|---|---|---|---|
| 5,997,977 A * | 12/1999 | Zou et al. | 428/64.1 |
| 6,187,407 B1 * | 2/2001 | Zou et al. | 428/64.2 |
| 6,949,485 B2 | 9/2005 | Nakashima et al. | |
| 7,189,438 B2 | 3/2007 | Momose et al. | |
| 7,309,671 B2 | 12/2007 | Kurachi et al. | |
| 7,595,273 B2 | 9/2009 | Ikenishi et al. | |
| 7,687,419 B2 | 3/2010 | Kawai | |
| 7,767,607 B2 | 8/2010 | Kurachi et al. | |
| 2002/0010066 A1 | 1/2002 | Nakashima et al. | |
| 2003/0220183 A1 | 11/2003 | Kurachi et al. | |
| 2004/0229006 A1 | 11/2004 | Momose et al. | |
| 2005/0003136 A1 | 1/2005 | Kurachi et al. | |
| 2005/0215414 A1 | 9/2005 | Kawai | |
| 2005/0244656 A1 | 11/2005 | Ikenishi et al. | |
| 2008/0053152 A1 | 3/2008 | Kurachi et al. | |
| 2011/0086241 A1 * | 4/2011 | Hachitani et al. | 428/846.9 |
| 2012/0107647 A1 | 5/2012 | Matsumoto et al. | |
| 2013/0231236 A1 * | 9/2013 | Kawai et al. | 501/63 |

FOREIGN PATENT DOCUMENTS

| | | | |
|---|---|---|---|
| JP | 2001-058843 A | 3/2001 | |
| JP | 2001-134925 A | 5/2001 | |
| JP | 2001-294441 A | 10/2001 | |
| JP | 2001-348246 A | 12/2001 | |
| JP | 2004-043295 A | 2/2004 | |
| JP | 2004-362746 A | 12/2004 | |
| JP | 2005-015328 A | 1/2005 | |
| JP | 2005-272212 A | 10/2005 | |
| JP | 2005-314159 A | 11/2005 | |
| JP | 2006-327935 A | 12/2006 | |
| JP | 2007-051064 A | 3/2007 | |
| JP | 2009-110626 A | 5/2009 | |
| WO | 2008/062847 A1 | 5/2008 | |
| WO | 2012/057338 A1 | 5/2012 | |

OTHER PUBLICATIONS

International Preliminary Report on Patentability issued in corresponding Patent Application No. PCT/JP2013/063046 dated Nov. 27, 2014.

* cited by examiner

GLASS FOR MAGNETIC RECORDING MEDIUM SUBSTRATE AND USAGE THEREOF

CROSS-REFERENCE TO RELATED APPLICATIONS

This is a Continuation of application Ser. No. 13/890,866 filed May 9, 2013, claiming priority based on Provisional Application 61/647,644 filed on May 16, 2012, which is expressly incorporated herein by reference in its entirety.

BACKGROUND OF THE INVENTION

1. Field of the Invention

The present invention relates to glass for a magnetic recording medium substrate that is suitable as a substrate material for magnetic recording media such as hard disks; a magnetic recording medium substrate employing the above glass and a method of manufacturing the same; a magnetic recording medium substrate blank usable for obtaining the above substrate; a magnetic recording medium equipped with the above substrate and a method of manufacturing the same; and a magnetic recording apparatus equipped with the above substrate.

2. Discussion of the Background

With the development of information-related infrastructure such as the Internet, the need for information recording media such as magnetic disks and optical disks has increased sharply. The main structural components of the magnetic memory devices of computers and the like are magnetic recording media and magnetic heads for magnetic recording and reproduction. Known magnetic recording media include flexible disks and hard disks. Of these, examples of the substrate materials employed in hard disks (magnetic disks) include aluminum substrates, glass substrates, ceramic substrates, and carbon substrates. In practical terms, depending on size and application, aluminum substrates and glass substrates are primarily employed. In the hard disk drives of laptop computers, along with higher density recording of magnetic recording media in addition to impact resistance, the requirement of increased surface smoothness of the disk substrate is intensifying. Thus, there are limits to how well aluminum substrates, with afford poor surface hardness and rigidity, can respond. Accordingly, the development of glass substrates is currently the mainstream (see, for example, Documents 1 to 10 and the following English language family members, which are expressly incorporated herein by reference in their entirety).

In recent years, with the goal of achieving even higher density recording in magnetic recording media, the use of magnetic materials of high magneto-anisotropic energy (magnetic materials of value), such as Fe—Pt and Co—Pt based materials, is being examined (see, for example, see Document 11 and the following English language family members, which are expressly incorporated herein by reference in their entirety). It is necessary to reduce the particle diameter of the magnetic particles to achieve higher density recording. However, when just the particle diameter is reduced, the deterioration of magnetic characteristics due to thermal fluctuation becomes a problem. Magnetic materials of high Ku value tend not to be affected by thermal fluctuation, and are thus expected to contribute to the achievement of greater recording density.

Document 1: Published Japanese Translation of a PCT international publication for patent application (TOKUHYO) No. Heisei 9-507206 or English language family member U.S. Pat. No. 5,958,812

Document 2: Japanese Unexamined Patent Publication (KOKAI) No. 2007-51064 or English language family member U.S. Pat. No. 5,900,296

Document 3: Japanese Unexamined Patent Publication (KOKAI) No. 2001-294441

Document 4: Japanese Unexamined Patent Publication (KOKAI) No. 2001-134925

Document 5: Japanese Unexamined Patent Publication (KOKAI) No. 2001-348246

Document 6: Japanese Unexamined Patent Publication (KOKAI) No. 2001-58843 or English language family member US2002/010066A1 and U.S. Pat. No. 6,949,485

Document 7: Japanese Unexamined Patent Publication (KOKAI) No. 2006-327935

Document 8: Japanese Unexamined Patent Publication (KOKAI) No. 2005-272212 or English language family members US 2005/215414A1 and U.S. Pat. No. 7,687,419

Document 9: Japanese Unexamined Patent Publication (KOKAI) No. 2004-43295 or English language family member US2003/220183A1, U.S. Pat. No. 7,309,671, US2008/053152A1, and U.S. Pat. No. 7,767,607

Document 10: Japanese Unexamined Patent Publication (KOKAI) No. 2005-314159 or English language family members US 2005/244656A1 and U.S. Pat. No. 7,595,273

Document 11: Japanese Unexamined Patent Publication (KOKAI) No. 2004-362746 or English language family members US 2004/229006A1 and U.S. Pat. No. 7,189,438

SUMMARY OF THE INVENTION

However, the above-described magnetic materials of high Ku value must be in a specific state of crystal orientation to exhibit a high Ku value. Thus, a film must be formed at high temperature or thermoprocessing must be conducted at high temperature following film formation. Accordingly, the formation of a magnetic recording layer comprised of such magnetic materials of high Ku value requires that a glass substrate have high heat resistance that is capable of withstanding the above-described processing at high temperatures, that is, have a high glass transition temperature.

By the way, in disk-shaped magnetic recording media, data are written and read in the direction of rotation by radially displacing a magnetic head while rotating the medium at high speed about a center axis. In recent years, the rotational speed has been increased from 5,400 rpm to 7,200 rpm, and up to a high speed of 10,000 rpm to increase the writing rate and reading rate. However, in disk-shaped magnetic recording media, since the positions at which data are recorded are assigned in advance based on the distance from the center axis, when the disk deforms during rotation, the magnetic head develops a positional displacement, compromising proper reading. Accordingly, to cope with higher rotational speeds described above, the glass substrate is required to have high rigidity (Young's modulus) so as to prevent substantial deformation during high-speed rotation.

Furthermore, the use of a glass substrate with a high coefficient of thermal expansion permits an increase in the reliability of recording and reproduction with magnetic recording media for the following reasons.

HDDs (hard disk drives), in which magnetic recording media are loaded, are configured such that the spindle of a spindle motor presses against the center portion, causing the magnetic recording medium itself to rotate. Thus, when there is a substantial difference in the coefficient of thermal expansion of the substrate of the magnetic recording medium and spindle material constituting the spindle portion, a discrepancy ends up developing between the thermal expansion and contraction of the spindle and those of the substrate of the magnetic recording medium in response to change in the surrounding temperature during use. As a result, the phenomenon in which the magnetic recording medium ends up changing shape occurs. When such phenomenon occurs, information that has been written cannot be read by a head, compromising recording and reproduction reliability. Accordingly, enhancing the reliability of magnetic recording media requires that glass substrates have high coefficient of thermal expansion similar to that of the spindle material (such as stainless steel).

Additionally, in recent years, to enhance the reliability of HDDs, good impact resistance has come to be demanded of the glass substrates employed in magnetic recording media of which extremely high recording densities are required. This has included energy-assisted magnetic recording media, the investigation of which is advancing.

As a first example, given this background, the flying height of the magnetic head (the gap between the magnetic head and the surface of the magnetic recording medium) has greatly decreased (flying height reduction). As that has occurred, the distance between the recording head and the magnetic layer of the medium has decreased, making it possible to pick up the signals of smaller magnetic particles, and permitting in turn even higher recording densities. In recent years, to achieve greater flying height reduction than in the past, a function known as DFH (Dynamic Flying Height) has been imparted to magnetic heads. It is a function whereby a heating element such as an extremely small heater is disposed in the vicinity of the recording and reproduction elements of the magnetic head, with just the area around the elements protruding toward the surface of the medium. In the future, based on this function, it is thought that the gap between the elements of the magnetic head and surface of the medium will decrease to less than 2 nm. Thus, even a slight shock will tend to cause the magnetic head to collide with the surface of the medium.

A second example is rapid rotation of the medium. That causes collisions with the magnetic head to increase when undergoing a shock. Since there is substantial deflection of the substrate at its outer perimeter, even a slight shock tends to cause a collision with the magnetic head. Due to the effects of fastening (securing) the medium with a spindle and clamps, there is a substantial possibility of the substrate cracking along the inner circumference portion when the HDD itself is subjected to an external shock.

An aspect of the present invention relates to:

glass for a magnetic recording medium substrate, which comprises:

essential components in the form of $SiO_2$, $Li_2O$, $Na_2O$, and one or more alkaline earth metal oxides selected from the group consisting of MgO, CaO, SrO, and BaO;

wherein a molar ratio of a content of MgO to a combined content of MgO, CaO, SrO, and BaO (MgO/(MgO+CaO+SrO+BaO)) is equal to or greater than 0.80; and which has a Young's modulus of equal to or greater than 80 GPa, and a glass transition temperature of equal to or greater than 620° C.

A further aspect of the present invention relates to:

glass for a magnetic recording medium substrate, which comprises:

essential components in the form of $SiO_2$, $Li_2O$ and $Na_2O$, and one or more alkaline earth metal oxides selected from the group consisting of MgO, CaO, SrO, and BaO;

wherein a molar ratio of a content of CaO to a combined content of MgO, CaO, SrO, and BaO (CaO/(MgO+CaO+SrO+BaO)) is equal to or less than 0.20; and which has a Young's modulus of equal to or greater than 80 GPa, and a glass transition temperature of equal to or greater than 620° C.

In an embodiment, the average coefficient of linear expansion at 100 to 300° C. of the above glass for a magnetic recording medium substrate is equal to or greater than $70 \times 10^{-7}/°$ C.

A further aspect of the present invention relates to:

glass for a magnetic recording medium substrate, which comprises:

essential components in the form of $SiO_2$, $Li_2O$, $Na_2O$, and one or more alkaline earth metal oxides selected from the group consisting of MgO, CaO, SrO, and BaO;

wherein a molar ratio of a content of MgO to a combined content of MgO, CaO, SrO, and BaO (MgO/(MgO+CaO+SrO+BaO)) is equal to or greater than 0.80; and which has an average coefficient of linear expansion at 100 to 300° C. of equal to or greater than $70 \times 10^{-7}/°$ C., and a glass transition temperature of equal to or greater than 620° C.

A further aspect of the present invention relates to:

glass for a magnetic recording medium substrate, which comprises:

essential components in the form of $SiO_2$, $Li_2O$, $Na_2O$, and one or more alkaline earth metal oxides selected from the group consisting of MgO, CaO, SrO, and BaO;

wherein a molar ratio of a content of CaO to a combined content of MgO, CaO, SrO, and BaO (CaO/(MgO+CaO+SrO+BaO)) is equal to or less than 0.20; and which has an average coefficient of linear expansion at 100 to 300° C. of equal to or greater than $70 \times 10^{-7}/°$ C., and a glass transition temperature of equal to or greater than 620° C.

In an embodiment, the Young's modulus of the above glass for a magnetic recording medium substrate is equal to or greater than 80 GPa.

In an embodiment, the specific modulus of elasticity of the above glass for a magnetic recording medium substrate is equal to or greater than 30 MNm/kg.

In an embodiment, the above glass for a magnetic recording medium substrate is the glass for chemical strengthening.

A further aspect of the present invention relates to:

a magnetic recording medium substrate, which is comprised of the above glass for a magnetic recording medium substrate.

A further aspect of the present invention relates to:

a magnetic recording medium substrate, which is comprised of chemically strengthened glass that has been prepared by chemically strengthening the above glass for a magnetic recording medium substrate.

In an embodiment, the fracture toughness value of the above glass substrate for a magnetic recording medium is equal to or greater than 0.9 MPa·m$^{1/2}$.

In an embodiment, the above magnetic recording medium substrate is comprised of chemically strengthened glass in which a tensile stress distribution is convex in shape such that the convex shape does not contain indentations indenting to a compressive stress side in a stress profile in a virtual cross section perpendicular to two main surfaces as obtained by the Babinet method.

In an embodiment, the above magnetic recording medium substrate is comprised of chemically strengthened glass in which an average value Tav of a tensile stress obtained by the Babinet method and a maximum value Tmax of the tensile stress satisfy the following expression (1):

$$T_{av}/T_{max} \geq 0.5.$$

In an embodiment, the above magnetic recording medium substrate is glass that has been chemically strengthened by immersion into a salt melt comprising sodium salt and potassium salt.

In an embodiment, the above magnetic recording medium substrate is glass that has been chemically strengthened by immersing glass which comprises equal to or greater than 0.1 mole percent of $Li_2O$ into the salt melt.

In an embodiment, the arithmetic average roughness (Ra) of a main surface of the above magnetic recording medium substrate as measured at a resolution of 512×256 pixels for a 1 μm square by an atomic force microscope is equal to or less than 0.15 nm.

In an embodiment, the above magnetic recording medium substrate is a substrate for use in a magnetic recording medium employed in a magnetic recording apparatus in which a rate of rotation is equal to or greater than 5,000 rpm.

In an embodiment, the above magnetic recording medium substrate is a substrate for use in a magnetic recording medium employed in a magnetic recording apparatus in which a DFH (dynamic flying height) head has been mounted.

In an embodiment, the above magnetic recording medium substrate is employed in an energy-assisted magnetic recording-use magnetic recording medium.

A further aspect of the present invention relates to:
a magnetic recording medium substrate blank, which is comprised of the above glass for a magnetic recording medium substrate.

In an embodiment, the above magnetic recording medium substrate blank is disk-shaped.

A further aspect of the present invention relates to:
a method of manufacturing a magnetic recording medium substrate, which comprises processing the above magnetic recording medium substrate blank.

In an embodiment, the above method of manufacturing a magnetic recording medium substrate comprises the step of chemically strengthening the glass by immersing the glass in a salt melt comprising sodium salt and potassium salt.

In an embodiment, glass comprising equal to or more than 0.1 mole percent of $Li_2O$ is chemically strengthened by immersion in the above salt melt in the above step.

In an embodiment, the above chemical strengthening is conducted so as to yield chemically strengthened glass in which the average value Tav of the tensile stress and the maximum value Tmax of the tensile stress obtained by the Babinet method satisfy the following expression (1):

$$Tav/Tmax \geq 0.5.$$

In an embodiment, the above chemical strengthening is conducted so as to yield chemically strengthened glass in which a tensile stress distribution is convex in shape such that the convex shape does not contain indentations indenting to a compressive stress side in a stress profile in a virtual cross section perpendicular to two main surfaces as obtained by the Babinet method.

A further aspect of the present invention relates to:
a magnetic recording medium, which comprises a magnetic recording layer on the above magnetic recording medium substrate.

In an embodiment, the magnetic recording layer comprises a magnetic material the principal components of which are an alloy of Fe and/or Co, and Pt, and the above magnetic recording medium is an energy-assisted magnetic recording-use magnetic recording medium.

A further aspect of the present invention relates to:
a method of manufacturing a magnetic recording medium, which comprises forming a film of a magnetic material the principal components of which are an alloy of Fe and/or Co, and Pt on a main surface of the above magnetic recording medium substrate, and then conducting an annealing treatment to form the magnetic recording layer.

A further aspect of the present invention relates to:
a magnetic recording apparatus of energy-assisted magnetic recording system, which comprises:
a heat-assisted magnetic recording head having a heat source to heat at least a main surface of a magnetic recording medium, a recording element member, and a reproduction element member; and
the above magnetic recording medium.

In an embodiment, the rate of rotation of the magnetic recording medium is equal to or greater than 5,000 rpm in the above magnetic recording apparatus.

In an embodiment, a DFH (dynamic flying height) head is mounted in the above magnetic recording apparatus.

An aspect of the present invention can provide a magnetic recording medium substrate having high heat resistance capable of withstanding a high-temperature heat treatment in the course of forming a magnetic recording layer comprised of a high Ku magnetic material, a high thermal expansion coefficient rivaling that of the support member (spindle), high rigidity capable of withstanding high-speed rotation, and/or high strength capable of withstanding impact; and a magnetic recording medium equipped with such a substrate.

MODES FOR CARRYING OUT THE INVENTION

Figure 1:
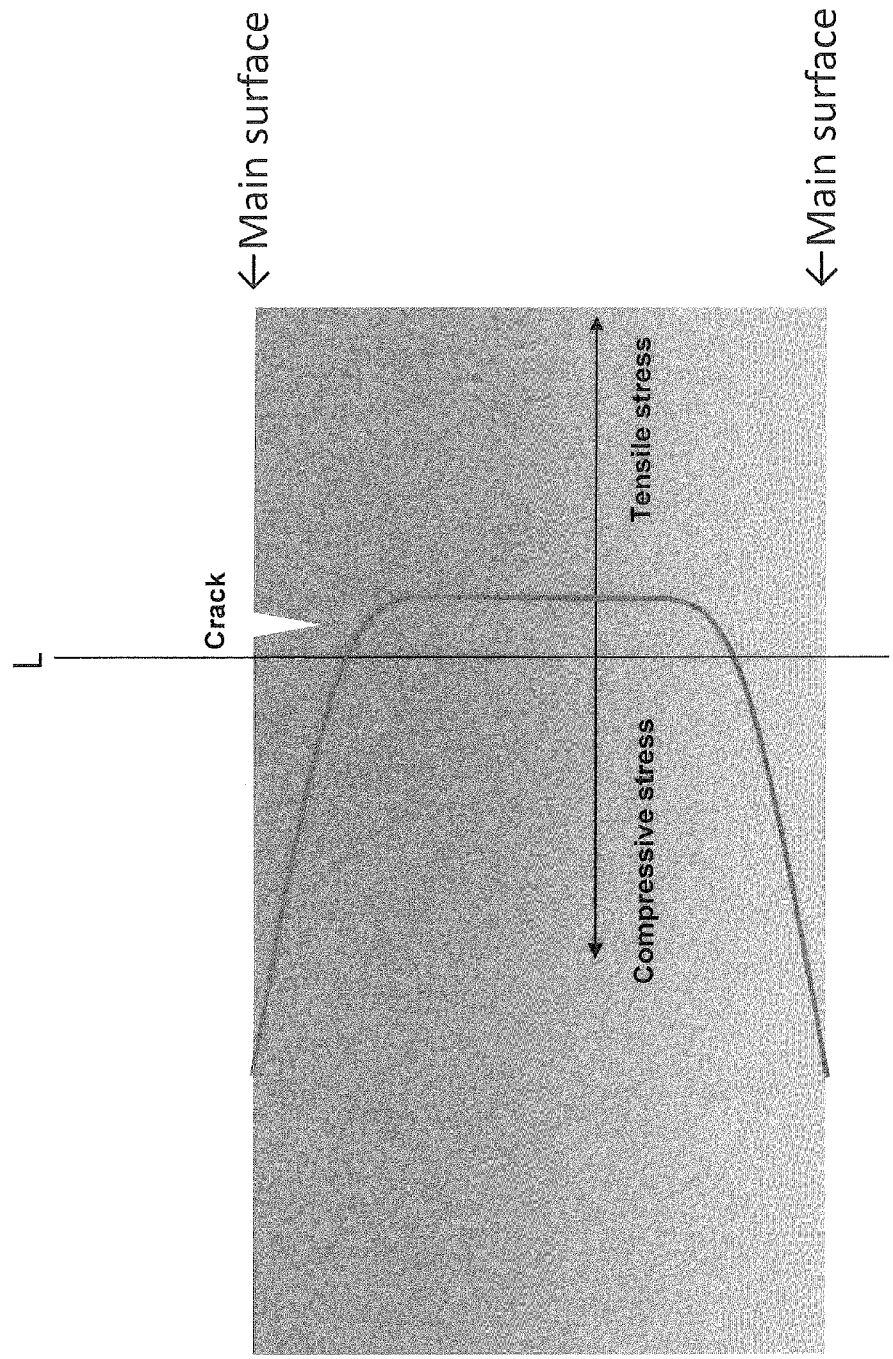
FIG. 1 is a schematic drawing of the stress profile in a chemically strengthened glass substrate.

The glass for a magnetic recording medium substrate according to an aspect of the present invention (referred to as "glass 1", hereinafter) comprises essential components in the form of $SiO_2$, $Li_2O$, $Na_2O$, and one or more alkaline earth metal oxides selected from the group consisting of MgO, CaO, SrO, and BaO; wherein the molar ratio of the content of MgO to the combined content of MgO, CaO, SrO, and BaO (MgO/(MgO+CaO+SrO+BaO)) is equal to or greater than 0.80; the Young's modulus is equal to or greater than 80 GPa; and the glass transition temperature is equal to or greater than 620° C.

The glass for a magnetic recording medium substrate according to a further aspect of the present invention (referred to as "glass 2", hereinafter) comprises essential components in the form of $SiO_2$, $Li_2O$, $Na_2O$, and one or more alkaline earth metal oxides selected from the group consisting of MgO, CaO, SrO, and BaO; wherein the molar ratio of the content of CaO to the combined content of MgO, CaO, SrO, and BaO (CaO/(MgO+CaO+SrO+BaO)) is equal to or less than 0.20; the Young's modulus is equal to or greater than 80 GPa; and the glass transition temperature is equal to or greater than 620° C.

The glass for a magnetic recording medium substrate according to a further aspect of the present invention (referred to as "glass 3", hereinafter) comprises essential components in the form of $SiO_2$, $Li_2O$, $Na_2O$, and one or more alkaline earth metal oxides selected from the group consisting of MgO, CaO, SrO, and BaO; wherein the molar ratio of the content of MgO to the combined content of MgO, CaO, SrO, and BaO (MgO/(MgO+CaO+SrO+BaO)) is equal to or greater than 0.80; the average coefficient of linear expansion at 100 to 300° C. is equal to or greater than $70 \times 10^{-7}/°$ C.; and the glass transition temperature is equal to or greater than 620° C.

The glass for a magnetic recording medium substrate according to a further aspect of the present invention (referred to as "glass 4", hereinafter) comprises essential components in the form of $SiO_2$, $Li_2O$, $Na_2O$, and one or more alkaline earth metal oxides selected from the group consisting of MgO, CaO, SrO, and BaO; wherein the molar ratio of the content of CaO to the combined content of MgO, CaO, SrO, and BaO (CaO/(MgO+CaO+SrO+BaO)) is equal to or less than 0.20; the average coefficient of linear expansion at 100 to 300° C. is equal to or greater than $70 \times 10^{-7}/°$ C.; and the glass transition temperature is equal to or greater than 620° C.

Glasses 1 and 2 can possess high heat resistance, high rigidity, and high strength. Glasses 3 and 4 can possess high heat resistance, high thermal expansion coefficients, and high strength. Glasses 1, 2, 3, and 4 will be described below. Unless specifically stated otherwise, the description given shall refer to all of glasses 1, 2, 3, and 4. Below, the glass of the present invention shall include glasses 1, 2, 3, and 4. Below, the glass corresponding to glasses 1 and 2, the glass corresponding to glasses 1 and 3, the glass corresponding to glasses 1 and 4, the glass corresponding to glasses 2 and 3, the glass corresponding to glasses 2 and 4, the glass corresponding to glasses 3 and 4, the glass corresponding to glasses 1, 2, and 3, the glass corresponding to glasses 1, 2, and 4, the glass corresponding to glasses 1, 3, and 4, the glass corresponding to glasses 2, 3, and 4, and the glass corresponding to glasses 1, 2, 3, and 4 shall all be considered preferred glasses according to an aspect of the present invention.

Further aspects of the present invention relate to:

a magnetic recording medium substrate comprised of the above glass; and a magnetic recording medium substrate obtained by chemically strengthening the above glass.

The various characteristics of the glasses and substrates according to aspects of the present invention will be described below. Unless specifically stated otherwise, the various characteristics described below refer to values after chemical strengthening in the case of chemically strengthened substrates.

1. Glass Transition Temperature

As set forth above, when attempting to achieve a high recording density in a magnetic recording medium by introducing a high Ku magnetic material or the like, the glass substrate for a magnetic recording medium is exposed to high temperature during high-temperature treatment of the magnetic material and the like. In this process, to prevent loss of the extremely high degree of flatness of the substrate, excellent heat resistance is demanded of the glass substrate for a magnetic recording medium. Employing the glass transition temperature as an index of heat resistance, having the glass of the present invention possess a glass transition temperature of equal to or greater than 620° C. makes it possible to maintain good flatness following high-temperature processing. Accordingly, the glass according to an aspect of the present invention is suitable for the fabrication of a substrate for a magnetic recording medium comprising a high Ku magnetic material. The desirable range of the glass transition temperature is equal to or greater than 630° C. The upper limit of the glass transition temperature can be about 750° C., for example. However, the higher the glass transition temperature the better and there is no specific limit. The glass transition temperature is a value that remains nearly constant before and after chemical strengthening.

2. Thermal Expansion Coefficient

As set forth above, when there is a large difference in coefficient of thermal expansion between the glass constituting the glass substrate for a magnetic recording medium and the spindle material (such as stainless steel) of an HDD, changes in temperature during the operation of the HDD cause the magnetic recording medium to deform, problems occur in recording and reproduction, and reliability ends up being compromised. In particular, in magnetic recording media having a magnetic recording layer comprised of a magnetic material of high Ku, the recording density is extremely high. Thus, even slight deformation of the magnetic recording medium tends to cause these problems.

Generally, HDD spindle materials have an average coefficient of linear expansion (thermal expansion coefficient) of equal to or greater than $70 \times 10^{-7}/°$ C. over the range of 100 to 300° C. Since glasses 3 and 4 have average coefficient of linear expansions of equal to or greater than $70 \times 10^{-7}/°$ C. over the range of 100 to 300° C., it is possible to enhance the reliability set forth above and to provide a substrate that is suited to a magnetic recording medium having a magnetic recording layer comprised of a high Ku magnetic material. For the same reason, the average coefficient of linear expansion over the temperature range of 100 to 300° C. of glasses 1 and 2 is desirably equal to or greater than $70 \times 10^{-7}/°$ C.

The average coefficient of linear expansion desirably falls within a range of equal to or greater than $71 \times 10^{-7}/°$ C., preferably within a range of equal to or greater than $72 \times 10^{-7}/°$ C., more preferably within a range of equal to or greater than $73 \times 10^{-7}/°$ C., still more preferably within a range of equal to or greater than $74 \times 10^{-7}/°$ C., and yet more preferably, within a range of equal to or greater than $75 \times 10^{-7}/°$ C. When the thermal expansion characteristics of the spindle material are taken into account, the upper limit of the average coefficient of linear expansion is, for example, desirably about $120 \times 10^{-7}/°$ C., preferably $100 \times 10^{-7}/°$ C., and more preferably, $88 \times 10^{-7}/°$ C. The thermal expansion coefficient is a value that remains nearly constant before and after chemical strengthening.

Further, in an embodiment, the average coefficient of linear expansion over the temperature range of 500 to 600° C. is desirably equal to or greater than $60 \times 10^{-7}/°$ C., preferably equal to or greater than $70 \times 10^{-7}/°$ C. The upper limit of the average coefficient of linear expansion is, for example, desirably equal to or lower than $100 \times 10^{-7}/°$ C., preferably $90 \times 10^{-7}/°$ C. By fabricating a substrate using glass having an average coefficient of linear expansion over the temperature range of 500 to 600° C. falling within the above-stated range, it is possible to reliably prevent separation of multiple layers of films from the glass substrate during and after annealing treatment following the formation of multiple layers of films of a high Ku magnetic material and the like, and detachment of the substrate from the support member during the annealing treatment.

3. Young's Modulus

Deformation of a magnetic recording medium includes deformation due to high speed rotation in addition to deformation due to change in the temperature of an HDD.

It is required to raise the Young's modulus of the magnetic recording medium substrate as set forth above to inhibit deformation during high-speed rotation. Glasses 1 and 2 have a Young's modulus of equal to or greater than 80 GPa. Thus, substrate distortion can be inhibited during high-speed rotation. Even in a high density recording magnetic recording medium in which a high Ku magnetic material has been incorporated, data reading and writing can be correctly conducted. For the same reason, glasses 3 and 4 desirably have Young's moduli of equal to or greater than 80 GPa.

The range of the Young's modulus is desirably equal to or greater than 81 GPa, preferably equal to or greater than 82 GPa, more preferably equal to or greater than 83 GPa, still more preferably equal to or greater than 84 GPa, yet more preferably equal to or greater than 85 GPa, and yet still more preferably, equal to or greater than 86 GPa. The upper limit of the Young's modulus is not specifically limited. To keep other characteristics within desirable ranges, an upper limit of 95 GPa, for example, can be considered as a yardstick. The Young's modulus is also a value that remains nearly unchanged before and after chemical strengthening treatment.

4. Specific Modulus of Elasticity and Specific Gravity

To inhibit deformation (substrate bending) of the magnetic recording medium during high-speed rotation, glass having a high specific modulus of elasticity is desirable as the substrate material. The specific modulus of elasticity is also a value that remains nearly constant before and after chemical strengthening. The range of the specific modulus of elasticity in the glass of the present invention is desirably equal to or greater than 30.0 MNm/kg, preferably greater than 30.0 MNm/kg, and more preferably, equal to or greater than 30.5 MNm/kg. The upper limit is about 40.0 MNm/kg, for example, but is not specifically limited. The specific modulus of elasticity is obtained by dividing the Young's modulus of the glass by the density. In this context, the "density" can be thought of as a quantity in units of $g/cm^3$ applied to the specific gravity of the glass. The specific modulus of elasticity can be increased by lowering the specific gravity of the glass, as well as by reducing the weight of the substrate. The weight of the magnetic recording medium is reduced by reducing the weight of the substrate, thereby reducing the power that is required to rotate the magnetic recording medium and keeping down the power consumption of the HDD. The range of the specific gravity of the glass of the present invention is desirably equal to or lower than 2.90, preferably equal to or lower than 2.80, and more preferably, lower than 2.70.

5. Fracture Toughness Value

The fracture toughness value is measured by the following method.

An MVK-E apparatus made by Akashi Corp. is employed. A sample that has been processed into sheet form is pressed with a Vickers indenter at a load P [N] to introduce an indentation and cracks into the sample. Denoting the Young's modulus as E [GPa], the diagonal length of indentation as d [m], and the surface crack half-length as a [m], the fracture toughness value $K_{1c}$ [Pa·m$^{1/2}$] is given by the following equation:

$$K_{1c}=[0.026(EP/\pi)^{1/2}(d/2)(a)^{-2}]/[(\pi a)^{-1/2}]$$

The fracture toughness value (load P=9.81 N (1,000 gf)) of the glass constituting the substrate according to an aspect of the present invention is desirably equal to or greater than 0.9 MPa·m$^{1/2}$. There is a trade-off between the fracture toughness value and heat resistance. When the heat resistance of the substrate is raised to increase the recording density of the magnetic recording medium, the fracture toughness value decreases and impact resistance ends up diminishing. By contrast, an aspect of the present invention can provide a glass substrate that is suited to a magnetic recording medium corresponding to a high recording density and achieving a balance between heat resistance, rigidity, and thermal expansion characteristics while raising the fracture toughness value. The fracture toughness value desirably falls within a range of equal to or greater than 1.0 MPa·m$^{1/2}$, preferably falls within a range of equal to or greater than 1.1 MPa·m$^{1/2}$, and more preferably, falls within a range of equal to or greater than 1.2 MPa·m$^{1/2}$. By having a fracture toughness value of equal to or greater than 0.9 MPa·m$^{1/2}$, it becomes possible to provide a magnetic recording medium of good impact resistance, high reliability, and corresponding to a high recording density. Unless specifically stated otherwise, in the present invention, the fracture toughness value means the fracture toughness value as measured at a load P of 9.81 N (1,000 gf). The fracture toughness value is desirably measured on a smooth glass surface, such as a polished surface, from the perspective of accurate measurement of the diagonal length of indentation d and the surface crack half-length a. In the present invention, the fracture toughness value of a substrate of chemically strengthened glass is the value of the glass that has been chemically strengthened. Since the fracture toughness value varies with the composition of the glass and the chemical strengthening conditions, the magnetic recording medium substrate according to an aspect of the present invention comprised of chemically strengthened glass can be obtained by adjusting the composition and chemical strengthening treatment conditions to keep the fracture toughness value within the desired range.

The fracture toughness value of the glass constituting the substrate according to an aspect of the present invention can also be denoted as the fracture toughness value at a load P of 4.9 N (500 gf). In that case, the fracture toughness value (load P=4.9 N (500 gf)) desirably exceeds 0.9 MPa·m$^{1/2}$, is preferably equal to or greater than 1.0 MPa·m$^{1/2}$, is more preferably equal to or greater than 1.1 MPa·m$^{1/2}$, is still more preferably equal to or greater than 1.2 MPa·m$^{1/2}$, and is yet still more preferably equal to or greater than 1.3 MPa·m$^{1/2}$.

5. Acid Resistance

In the course of producing a glass substrate for a magnetic recording medium, the glass is processed into a disk shape, and the main surfaces are processed to be extremely flat and smooth. Following these processing steps, the glass substrate is usually washed with acid to remove organic material in the form of grime that has adhered to the surface. If the glass substrate has poor resistance to acid, surface roughening occurs during the cleaning with acid, flatness and smoothness are lost, and use as a glass substrate for a magnetic recording medium becomes difficult. It is particularly desirable for a glass substrate for use in a high recording density magnetic recording medium having a magnetic recording layer comprised of a high Ku magnetic material in which high flatness and smoothness of the glass substrate surface are required to have good acid resistance.

It is also possible to obtain a substrate in an even cleaner state by removing foreign material such as abrasive that has adhered to the surface by washing with an alkali following washing with an acid. To prevent a decrease in the flatness and smoothness of the substrate surface due to surface roughening during alkali washing, it is desirable for the glass substrate to have good resistance to alkalinity. Having good resistance to acidity and alkalinity with a high degree of flatness and smoothness of the substrate surface are advantageous from the perspective of achieving the above-described low flying height. In an embodiment of the present invention, by adjusting the glass composition, particularly by adjustment to a composition that is advantageous to chemical durability, makes it possible to achieve good resistance to acidity and alkalinity.

6. Liquidus Temperature

In the course of melting glass and molding the glass melt obtained, the glass crystallizes and a homogenous glass cannot be produced when the molding temperature is lower than the liquidus temperature. Thus, the glass molding temperature must be greater than or equal to the liquidus temperature. However, when the molding temperature exceeds 1,300° C., for example, the pressing mold employed in the course of press molding a glass melt reacts with the hot glass and tends to be damaged. Even when conducting molding by casting a glass melt into a casting mold, the casting mold tends to be similarly damaged. Taking these points into account, the liquidus temperature of the glass according to an aspect of the present invention is desirably equal to or lower than 1,300° C. The liquidus temperature preferably falls within a range of equal to or lower than 1,280° C., more preferably a range of equal to or lower than 1,250° C. In an embodiment the present invention, the liquidus temperature within the above desirable range can be achieved by conducting the adjustment of glass composition. The lower limit is not specifically limited, but a temperature of equal to or higher than 800° C. can be thought of as a yardstick.

7. Spectral Transmittance

A magnetic recording medium is produced by a process of forming a multilayered film comprising a magnetic recording layer on a glass substrate. In the course of forming a multilayered film on a substrate by the single substrate film forming method that is currently the mainstream, for example, the glass substrate is first introduced into the substrate heating region of a film-forming apparatus and heated to a temperature at which film formation by sputtering or the like is possible. Once the temperature of the glass substrate has risen adequately, the glass substrate is moved to a first film-forming region where a film corresponding to the lowest layer of the multilayer film is formed on the glass substrate. Next, the glass substrate is moved to a second film-forming region where a film is formed over the lowermost layer. The multilayered film is thus formed by sequentially moving the glass substrate to subsequent film-forming regions and forming films. Since the heating and film formation are conducted under reduced pressure achieved by evacuation with a vacuum pump, heating of the substrate must be conducted by a non-contact method. Thus, the glass substrate is suitably heated by radiation. This film formation must be conducted while the glass substrate is not at a temperature that is lower than the temperature suited to film formation. When the time required for forming each layer of the film is excessively long, the temperature of the glass substrate that has been heated drops, and there is a problem in that it is impossible to achieve an adequate glass substrate temperature in subsequent film-forming regions. To maintain the glass substrate at a temperature permitting film formation for an extended period, heating the substrate to a higher temperature is conceivable. However, when the heating rate of the glass substrate is low, the heating period must be extended, and the time during which the glass substrate remains in the heating region must be increased. Thus, the residence time of the glass substrate in each film-forming region increases, and an adequate glass substrate temperature ends up not being maintained in subsequent film-forming regions. Further, it becomes difficult to increase throughput. In particular, when producing a magnetic recording medium comprising a magnetic recording layer comprised of a magnetic material of high Ku, it is desirable to further increase the efficiency of heating the glass substrate with radiation so as to heat the glass substrate to a high temperature within a prescribed period.

In glasses containing $SiO_2$ and $Al_2O_3$, absorption peaks are present in the region containing the wavelengths of 2,750 to 3,700 nm. The absorption of radiation at shorter wavelengths can be increased by adding an infrared-absorbing agent, described further below, or by incorporating it as a glass component, thereby imparting absorption in the wavelength range of wavelengths of 700 to 3,700 nm. The use of infrared radiation having a spectral maximum in the above wavelength range is desirable to efficiently heat the glass substrate with radiation, that is, by irradiation with infrared radiation. It is conceivable to increase the power of the infrared radiation while matching the maximum spectral wavelength of the infrared radiation with the peak absorption wavelength of the substrate. Taking the example of a high-temperature carbon heater as an infrared source, it suffices to increase the input to the carbon heater to increase the power of the infrared radiation. However, considering the radiation from the carbon heater as black body radiation, an increase in the input increases the heater temperature. This shifts the maximum wavelength of the infrared radiation spectrum to the short wavelength side, ending up outside the absorption wavelength region of the glass. Thus, the powder consumption of the heater must be made excessively high to increase the heating rate of the substrate, creating a problem by shortening the service lifetime of the heater or the like.

In light of such points, increasing the absorption of the glass in the above wavelength region (wavelengths 700 to 3,700 nm), irradiating infrared radiation with the maximum spectral wavelength of the infrared radiation in a state of proximity to the peak absorption wavelength of the substrate, and not employing an excessive heater input are desirable. Accordingly, to increase the infrared radiation heating efficiency, either the presence of a region in which the spectral transmittance as converted to a thickness of 2 mm is equal to or less than 50 percent in the 700 to 3,700 nm wavelength region in the glass substrate, or a glass substrate with transmittance characteristics such that the spectral transmission as converted to a thickness of 2 mm is equal to or less than 70 percent over the above wavelength region is desirable. For example, the oxide of at least one metal selected from the group consisting of iron, copper, cobalt, ytterbium, manganese, neodymium, praseodymium, niobium, cerium, vanadium, chromium, nickel, molybdenum, holmium, and erbium can function as an infrared-absorbing agent. Further, water or OH groups contained in water absorb strongly in the 3 μm band, so water can also function as an infrared-absorbing agent. Incorporating a suitable quantity of a component that is capable of functioning as the above infrared-absorbing agent into the glass composition can impart the above desirable absorption characteristic to the glass substrate. The quantity added of the oxide that is capable of functioning as the infrared-absorbing agent is desirably 500 ppm to 5 percent, preferably 2,000 ppm to 5 percent, more preferably 2000 ppm to 2 percent, and still more preferably, falls within a range of 4,000 ppm to 2 percent based on the mass as the oxide. For water, the incorporation of more than 200 ppm is desirable, and the incorporation of equal to or more than 220 ppm is preferred, based on weight as converted to $H_2O$.

When employing $Yb_2O_3$ and $Nb_2O_5$ as glass components, and when adding Ce oxide as a clarifying agent, infrared absorption by these components can be used to enhance substrate heating efficiency.

The glass for a magnetic recording medium substrate according to an aspect of the present invention is an oxide glass. The glass composition is indicated based on oxides. The term "glass composition based on oxides" refers to a glass composition that is obtained by conversion when all of the glass starting materials fully break down during melting and are present in the glass as oxides. The above glass is desirably an amorphous glass because the amorphous glass does not require a heat treatment step for crystallization and affords good processing qualities.

The glass for a magnetic recording medium substrate according to an aspect of the present invention is suited to chemical strengthening. In an embodiment of the present invention, chemical strengthening means low-temperature chemical strengthening.

In the present invention, "main surfaces" means the surfaces with the broadest areas among the surfaces of the glass substrate or glass. In the case of a disk-shaped glass substrate, the pair of surfaces on the opposing front and back of the round disk shape (excluding the center hole when one is present) corresponds to the main surfaces.

Glasses 1 and 3 comprise essential components in the form of $SiO_2$, $Li_2O$, $Na_2O$, and one or more alkaline earth metal oxides selected from the group consisting of MgO, CaO, SrO, and BaO; wherein the molar ratio of the content of MgO to the combined content of MgO, CaO, SrO, and BaO (MgO/(MgO+CaO+SrO+BaO)) is equal to or greater than 0.80.

Glasses 2 and 4 comprise essential components in the form of $SiO_2$, $Li_2O$, $Na_2O$, and one or more alkaline earth metal oxides selected from the group consisting of MgO, CaO, SrO, and BaO; wherein the molar ratio of the content of CaO to the combined content of MgO, CaO, SrO, and BaO (CaO/(MgO+CaO+SrO+BaO)) is equal to or less than 0.20.

The glass composition of the glass for a magnetic recording medium substrate according to an aspect of the present invention will be described in greater detail below.

$SiO_2$ is a glass network forming component that has the effects of enhancing glass stability, chemical durability, and in particular, acid resistance. It is a component that serves to lower the thermal dispersion of the substrate and raise heating efficiency when heating the substrate with radiation in the process of forming a magnetic recording layer and the like on the glass substrate for a magnetic recording medium and to heat films that have been formed by the above process. When the $SiO_2$ content is excessive, the $SiO_2$ does not fully melt, unmelted matter may remain in the glass, the viscosity of the glass during clarification may become excessive, and bubble removal may become inadequate. Thus, the $SiO_2$ content is desirably 56 to 75 mole percent.

$Al_2O_3$ is a component that serves to enhance rigidity and heat resistance. When the $Al_2O_3$ content becomes excessive, and the resistance to devitrification (stability) of the glass decreases, thus, the content is desirably 1 to 20 mole percent. The $Al_2O_3$ content preferably falls within a range of 1 to 15 mole percent, and more preferably, within a range of 1 to 11 mole percent.

Preferred glasses among the above-described glasses containing $SiO_2$ and $Al_2O_3$ contain an alkali metal oxide $R_2O$ (where R denotes Li, Na, or K). $R_2O$ is a component that has the effects of improving the meltability and homogeneity of the glass, raising the thermal expansion coefficient, and permitting chemical strengthening. However, when the $R_2O$ content becomes excessive, the glass transition temperature may drop and the chemical durability of the glass may deteriorate. Thus, the $R_2O$ content is desirably 4 to 20 mole percent, The $R_2O$ content preferably falls within a range of 4 to 15 mole percent, and more preferably falls within a range of 6 to 15 mole percent. In this context, the $R_2O$ content means the combined content of $Li_2O$, $Na_2O$, and $K_2O$. In an aspect of the present invention, $Li_2O$ and $Na_2O$, which effectively serve to chemically strengthen without compromising heat resistance, are incorporated as $R_2O$ as essential components.

K has a higher atomic number than the alkali metals Li and Na, and serves to lower the fracture toughness value among the alkali metal components. When the substrate of the present invention is a chemically strengthened glass substrate, K serves to reduce the ion exchange efficiency. Accordingly, in the glass for a magnetic recording medium substrate of the present invention, a glass with a $K_2O$ content of less than 3 mole percent is desirable. The $K_2O$ content desirably falls within a range of 0 to 2 mole percent, preferably within a range of 0 to 1 mole percent, more preferably within a range of 0 to 0.5 mole percent, still more preferably within a range of 0 to 0.1 mole percent, and yet still more preferably, is 0 percent.

The glass for a magnetic recording medium substrate according to an aspect of the present invention contains an alkali earth metal oxide R'O (where R' denotes Mg, Ca, Sr, or Ba) as a glass component. R'O has the effects of enhancing the meltability of the glass and raising the thermal expansion coefficient. However, when the content of R'O becomes excessive, although not to the extent when excessive $R_2O$ is present, it may lower the glass transition temperature and may compromise chemical durability. From these perspectives, the content of R'O desirably falls within a range of 3 to 30 mole percent. The R'O content refers to the combined content of MgO, CaO, SrO, and BaO. It is possible not to incorporate any BaO. The combined content of alkaline earth metal oxides selected from the group consisting of MgO, CaO, and SrO is desirably 10 to 30 mole percent.

When a glass containing $Li_2O$ and $Na_2O$ is chemical strengthened by immersion in a mixed salt melt of sodium salt and potassium salt, $Li^+$ ions in the glass undergo ion exchange with $Na^+$ ions in the salt melt, and $Na^+$ ions in the glass undergo ion exchange with $K^+$ ions in the salt melt. A compressive stress layer is formed near the surface and a tensile stress layer is formed in the interior of the glass.

The glass for a magnetic recording medium substrate according to an aspect of the present invention has a high glass transition temperature of equal to or greater than 620° C., good heat resistance, and is suitable as a substrate material for use in a magnetic recording medium for forming a magnetic recording layer comprised of a high Ku magnetic material. In the high-temperature treatment and the like of magnetic materials, the glass substrate is exposed to elevated temperatures. However, if a glass material with a high glass transition temperature such as that set forth above is employed, the flatness of the substrate is not lost.

Figure 2:
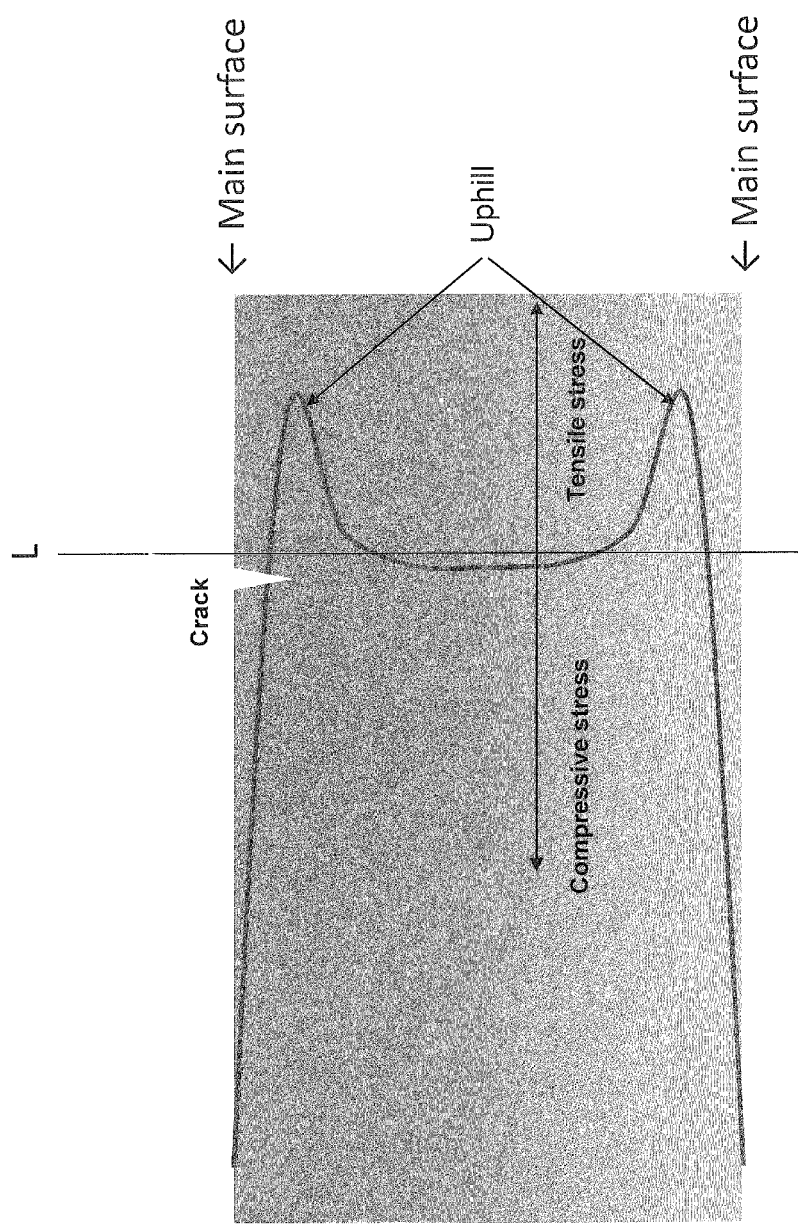
FIG. 2 is a schematic drawing of the stress profile in a chemically strengthened glass substrate.

The diffusion rate of the alkali metal ions in the glass increases as the ion radius decreases. Thus, the $Na^+$ ions in the salt melt penetrate to a deeper layer from the glass surface, forming a deep compressive stress layer. The $K^+$ ions in the salt melt do not penetrate to as deep a layer as the $Na^+$ ions, and form a compressive stress layer in a shallow portion from the surface. The stress distribution in the direction of depth of the glass that has been chemically strengthened by the mixed salts is comprised of a stress distribution formed by ion exchange between $Na^+$ and $Li^+$ and a stress distribution formed by ion exchange between $K^+$ and $Na^+$. Thus, the stress distribution in the direction of depth changes gradually. As shown in the schematic drawing of FIG. 1, in the stress profile in a virtual cross section perpendicular to the two main surfaces as measured by the Babinet method, the tensile stress distribution is convex in shape. This convex shape does not contain indentations that indent to the compressive stress side, as shown in FIG. 2, described further below. Further, a relative deep compressive stress layer is formed. In FIG. 1, there is a compressive stress region to the left of centerline L. The right side is the tensile stress region.

Even assuming that cracks open in the surface of the glass and reach the tensile stress layer, a chemically strengthened glass with the above stress distribution would not immediately fracture.

In contrast, when chemically strengthening a glass containing $Na_2O$ and not containing $Li_2O$, immersing the glass in a potassium salt melt and causing the $Na^+$ ions in the glass to exchange with the K ions in the salt melt would form a compressive stress layer in the vicinity of the glass surface. $K^+$ ions have a lower diffusion rate than $Na^+$ and $Li^+$ ions and do not reach the deep layers of the glass. The compressive strength layer would be shallow, the stress distribution in the direction of depth would change abruptly, and as shown in the schematic diagram of FIG. 2, the spots near the sides of the two main surfaces and away from the center portion of the main surfaces would present maxima in the stress profile in a virtual cross section perpendicular to the two main surfaces as measured by the Babinet method. That is, the tensile stress would be maximal in two spots. Such maxima are referred to as "uphills." In such a glass, if cracks were to form in the glass surface and reach the tensile stress layer, the ends of the cracks would reach the region of maximal tensile stress, and progression of the fractures would be exacerbated by the tensile stress, causing so-called "delayed fracturing."

In the glass for a magnetic recording medium substrate according to an aspect of the present invention, since $Li_2O$ and $Na_2O$ are contained as glass components, chemical strengthening by a mixed salt of $Na^+$ and $K^+$ can prevent delayed fracturing. From the perspective of even more effectively preventing delayed fracturing, the $Li_2O$ content is desirably equal to or greater than 0.1 mole percent.

The glass for a magnetic recording medium substrate according to an aspect of the present invention contains one or more from among the alkaline earth metal oxides MgO, CaO, SrO, and BaO. These alkaline earth metal oxides have the effects of improving the meltability of the glass and raising the thermal expansion coefficient.

By the way, when chemically strengthening glass with a high glass transition temperature, the strengthening treatment temperature also rises. When chemically strengthening glass with a high glass transition temperature, the drop in ion exchange efficiency that presents no problem in conventional glasses with relatively low glass transition temperatures becomes pronounced.

The present inventors conducted research on this point that resulted in the following discovery.

The ionic radii of the alkali metal ions $Li^+$, $Na^+$, and $K^+$ and the alkaline earth metal ions $Mg^{2+}$, $Ca^{2+}$, $Sr^{2+}$, and $Ba^{2+}$ according to Pauling are given in Table 1.

TABLE 1

| Alkali metal ion | Ionic radius | Alkaline earth metal ion | Ionic radius |
|---|---|---|---|
| $Li^+$ | 60 pm | $Mg^{2+}$ | 65 pm |
| $Na^+$ | 95 pm | $Ca^{2+}$ | 99 pm |
| $K^+$ | 133 pm | $Sr^{2+}$ | 113 pm |
|  |  | $Ba^{2+}$ | 135 pm |

As will be clear from Table 1, the ion radii of $Li^+$ and $Mg^{2+}$, $Na^+$ and $Ca^{2+}$, and $K^+$ and $Sr^{2+}$ have similar values. When the strengthening treatment temperature is raised, in addition to ion exchange between the alkali metal ions in the glass and in the salt melt, an ion exchange also takes place between the alkaline earth metal ions in the glass and the alkali metal ions in the salt melt. In particular, the rate of ion exchange between alkali metal ions and alkaline earth metal ions of similar ion radius values is thought to increase.

When employing a mixed salt melt of sodium salt and potassium salt to chemically strengthen a glass containing CaO, in parallel with the reaction $Na^+$ (glass)$\Leftrightarrow K^+$ (salt melt), the reaction $Ca^{2+}$ (glass)$\Leftrightarrow Na^+$ (salt melt) takes place and exchanges between alkali metal ions are thought to be impeded.

If a lithium salt melt is not employed, the $Mg^{2+}$ in the glass does not undergo the ion exchange of $Mg^{2+}$ (glass)$\Leftrightarrow Li^+$ (salt melt). Since the ion radius of $Sr^{2+}$ in the glass is large and its diffusion rate is slow, it tends not to exchange with $K^+$ in the salt melt.

Accordingly, to resolve the decrease in mechanical strength in glasses 1 and 3 that is thought to occur due to the drop in the ion exchange efficiency that is peculiar to chemical strengthening of a highly heat-resistant glass, the proportion of MgO, a component that effectively raises the Young's modulus without decreasing the ion-exchange efficiency, is increased among the alkaline earth metal oxides. That is, the molar ratio of the MgO content relative to the combined content of MgO, CaO, SrO, and BaO (MgO/(MgO+CaO+SrO+BaO)) is made equal to or greater than 0.80 to resolve the drop in mechanical strength. From the perspectives of maintaining ion-exchange efficiency and mechanical strength, the molar ratio (MgO/(MgO+CaO+SrO+BaO)) desirably falls within a range of 0.85 to 1.00, preferably falls within a range of 0.90 to 1.00, and more preferably, falls within a range of 0.95 to 1.00. When the present inventors caused multiple alkaline earth metal oxides to be present as glass components, they discovered that the glass transition temperature exhibited a tendency to drop. Based on this knowledge, it is desirable to concentrate to the extent possible the alkaline earth metal oxides into a single type to maintain heat resistance. That is, keeping the molar ratio (MgO/(MgO+CaO+SrO+BaO)) to within the above-stated range is desirable to maintain heat resistance.

Additionally, to resolve the drop in mechanical strength in glasses 2 and 4 that is thought to occur due to the drop in the ion exchange efficiency that is peculiar to chemical strengthening of a highly heat-resistant glass, the proportion of CaO, a component that decreases the ion-exchange efficiency, is suppressed among the alkaline earth metal oxides. That is, the molar ratio of the CaO content relative to the combined content of MgO, CaO, SrO, and BaO (CaO/(MgO+CaO+SrO+BaO)) is made equal to or less than 0.20 to resolve the drop in mechanical strength. From the perspectives of maintaining ion-exchange efficiency and mechanical strength, the molar ratio (CaO/(MgO+CaO+SrO+BaO)) desirably falls within a range of 0 to 0.18, preferably within a range of 0 to 0.16, more preferably within a range of 0 to 0.15, and still more preferably, within a range of 0 to 0.10.

The glass for a magnetic recording medium substrate according to an aspect of the present invention can also contain an oxide selected from the group consisting of $ZrO_2$, $TiO_2$, $Y_2O_3$, $La_2O_3$, $Gd_2O_3$, $Nb_2O_5$, and $Ta_2O_5$. $ZrO_2$, $TiO_2$, $Y_2O_3$, $La_2O_3$, $Gd_2O_3$, $Nb_2O_5$, and $Ta_2O_5$ are components that increase rigidity and heat resistance. Thus, the incorporation of at least one of them is desirable. However, the incorporation of an excessive quantity compromises the meltability and thermal expansion characteristics of the glass. Accordingly, the combined quantity of these oxides desirably falls within a range of more than 0 mole percent to equal to or less than 10 mole percent, and preferably falls within a range of 0.5 to 10 mole percent.

$B_2O_3$ is a component that reduces the brittleness of the glass substrate and enhances the meltability of the glass. However, the incorporation of an excessive quantity reduces the heat resistance. Thus, in the various glasses set forth above, the quantity incorporated is desirably kept to 0 to 3 mole percent, preferably 0 to 2 mole percent, more preferably equal to or more than 0 mole percent but less than 1 mole percent, and still more preferably, to 0 to 0.5 mole percent. It is also possible to substantially not incorporate any.

The composition of one glass for a magnetic recording medium substrate according to an aspect of the present invention is desirably adjusted such that it comprises:
56 to 75 mole percent of $SiO_2$,
1 to 20 mole percent of $Al_2O_3$,
a combined 6 to 15 mole percent of alkali metal oxides selected from the group consisting of $Li_2O$, $Na_2O$, and $K_2O$,
a combined 10 to 30 mole percent of alkaline earth metal oxides selected from the group consisting of MgO, CaO, and SrO, and
a combined more than 0 mole percent to equal to or less than 10 mole percent of oxides selected from the group consisting of $ZrO_2$, $TiO_2$, $Y_2O_3$, $La_2O_3$, $Gd_2O_3$, $Nb_2O_5$, and $Ta_2O_5$;
wherein the glass transition temperature is equal to or greater than 620° C., the average coefficient of linear expansion at 100 to 300° C. is equal to or greater than $70\times10^{-7}$/° C., the Young's modulus is equal to or greater than 81 GPa, the specific modulus of elasticity is equal to or greater than 30 MNm/kg, and the fracture toughness value is equal to or greater than 0.9 MPa·m$^{1/2}$. With regard to the adjustment of the composition, the content of $K_2O$ in the above glass desirably falls within the range set forth above, for example. Since BaO, an alkaline earth metal oxide, serves to lower the fracture toughness, the upper limit of the content thereof is desirably limited so that the fracture toughness value is equal to or greater than 0.9 MPa·m$^{1/2}$. The fracture toughness value desirably falls within the range set forth above. When the fracture toughness value obtained by measurement at a load of 4.9 N (500 gf) is employed, it suffices to limit the upper limit of the BaO content such that the fracture toughness value (load 4.9 N (500 gf)) exceeds 0.9 MPa·m$^{1/2}$. The fracture toughness value (load 4.9 N (500 gf)) desirably falls within the range set forth above. As set forth above, it is also possible not to incorporate any BaO. When the substrate of the present invention is a chemically strengthened glass substrate, at least a portion of the alkali metal atoms constituting the above alkali metal oxide in the substrate are ion exchanged. In the present invention, unless specifically stated otherwise, the above is also applied to the glass composition of the chemically strengthened glass substrate.

One desirable aspect of the magnetic recording medium substrate according to an aspect of the present invention is a glass substrate characterized by being subjected to chemical strengthening, that is, a chemically strengthened glass substrate. Chemical strengthening can further raise the fracture toughness value of the glass substrate. Chemical strengthening is desirably conducted with a melt of potassium nitrate or sodium nitrate, or a melt of potassium nitrate and sodium nitrate, to further raise the fracture toughness value. Glass components in the form of ion-exchangeable components such as $Li_2O$ and $Na_2O$ are incorporated into the glass of the present invention that has been chemically strengthened to obtain the glass substrate.

The glass substrate for a magnetic recording medium according to an aspect of the present invention has a high Young's modulus, a high specific modulus of elasticity, and a high fracture toughness. Thus, it is suitably employed in a magnetic recording apparatus with a rotational speed of equal to or higher than 5,000 rpm in which high reliability is required, more suitably employed in a magnetic recording apparatus with a rotational speed of equal to or higher than 7,200 rpm, and still more suitably employed in a magnetic recording apparatus with a rotational speed of equal to or higher than 10,000 rpm.

Similarly, the substrate for a magnetic recording medium according to an aspect of the present invention is suitable for use in a magnetic recording apparatus in which is mounted a DFH (dynamic flying height) head of which high reliability is required.

Examples of preferred compositions of the glass according to an aspect of the present invention will be given next.

One example of the above glass, denoted as mole percent, is a glass comprising:
56 to 75 percent of $SiO_2$,
1 to 20 percent of $Al_2O_3$,
more than 0 percent but equal to or less than 4 percent of $Li_2O$,
equal to or greater than 1 percent but less than 15 percent of $Na_2O$, and
equal to or greater than 0 percent but less than 3 percent of $K_2O$;
substantially comprising no BaO;
wherein the combined content of alkali metal oxides selected from the group consisting of $Li_2O$, $Na_2O$, and $K_2O$ falls within a range of 6 to 15 percent;
the molar ratio of the $Li_2O$ content relative to the $Na_2O$ content ($Li_2O/Na_2O$) is less than 0.50;
the molar ratio of $K_2O$ to the combined content of alkali metal oxides ($K_2O/(Li_2O+Na_2O+K_2O)$) is equal to or less than 0.13;
the combined content of alkaline earth metal oxides selected from the group consisting of MgO, CaO, and SrO falls within a range of 10 to 30 percent;
the combined content of MgO and CaO falls within a range of 10 to 30 percent;
the molar ratio of the combined content of MgO and CaO relative to the combined content of alkaline earth metal oxides ((MgO+CaO)/(MgO+CaO+SrO)) is equal to or greater than 0.86;
the molar ratio of the combined content of MgO, CaO, and $Li_2O$ to the combined content of the above alkali metal oxides and alkaline earth metal oxides ((MgO+CaO+$Li_2O$)/($Li_2O+Na_2O+K_2O+MgO+CaO+SrO$)) is equal to or greater than 0.50; and the combined content of oxides selected from the group consisting of $ZrO_2$, $TiO_2$, $Y_2O_3$, $La_2O_3$, $Gd_2O_3$, $Nb_2O_5$, and $Ta_2O_5$ is greater than 0 percent but equal to or less than 10 percent (referred to as glass A, hereinafter).

A further example is glass that is glass A wherein the molar ratio of the combined content of the above oxides to the $Al_2O_3$ content (($ZrO_2+TiO_2+Y_2O_3+La_2O_3+Gd_2O_3+Nb_2O_5+Ta_2O_5$)/$Al_2O_3$) is equal to or greater than 0.40 (referred to as glass A-1, hereinafter).

Below, unless specifically stated otherwise, the contents, combined contents, and ratios of the various components are denoted in molar basis.

The above glasses are oxide glasses, desirably amorphous oxide glasses. The glass compositions thereof are denoted based on oxides. An oxide-based glass composition is a glass composition that is obtained by conversion when all of the glass starting materials fully break down during melting and are present in the glass as oxides. In the description of various glass components given below, the contents, combined contents, and ratios of the various components apply to glass A, unless specifically stated otherwise.

$SiO_2$ is a glass network-forming component having the effects of enhancing the stability, chemical durability, and particularly, the acid resistance of the glass. In the course of heating the substrate with radiation in the step of forming a magnetic recording layer or the like on the glass substrate for a magnetic recording medium, or in the heat treatment of a film that has been formed by the above step, it is a component that serves to lower the thermal diffusion of the substrate and raise heating efficiency. When the content of $SiO_2$ is less than 56 percent, the chemical durability decreases. When 75 percent is exceeded, rigidity diminishes. Further, when the $SiO_2$ content exceeds 75 percent, the $SiO_2$ does not fully melt, unmelted material may remain in the glass, the viscosity of the glass may become excessively high during clarification, and bubbles may not be adequately eliminated. When a substrate is fabricated from glass containing unmelted material, protrusions are produced on the surface of the substrate due to the unmelted material during polishing, precluding use as a magnetic recording medium substrate of which extremely high surface smoothness is required. Further, when a substrate is fabricated from glass containing bubbles, a portion of the bubbles are exposed on the surface of the substrate by polishing. That portion becomes pits that compromise the smoothness of the main surfaces of the substrate. Thus, use as a magnetic recording medium is precluded. For these reasons, the $SiO_2$ content is set to 56 to 75 percent. The $SiO_2$ content desirably falls within a range of 58 to 70 percent, preferably within a range of 60 to 70 percent.

$Al_2O_3$ is a component that also contributes to glass network formation and serves to enhance rigidity and heat resistance. However, when the content of $Al_2O_3$ exceeds 20 percent, glass resistance to devitrification (stability) decreases. Thus, the quantity incorporated is set to equal to or less than 20 percent. Additionally, when the content of $Al_2O_3$ is less than 1 percent, the stability, chemical durability, and heat resistance of the glass deteriorate. Thus, the quantity incorporated is set to equal to or greater than 1 percent. Accordingly, the content of $Al_2O_3$ falls within a range of 1 to 20 percent. From the perspectives of the stability, chemical durability, and heat resistance of the glass, the content of $Al_2O_3$ desirably falls within a range of 1 to 15 percent, and preferably falls within a range of 1 to 11 percent. From the perspectives of the stability, chemical durability, and heat resistance of the glass, the content of $Al_2O_3$ desirably falls within a range of 1 to 10 percent, preferably within a range of 2 to 9 percent, and more preferably, within a range of 3 to 8 percent. From the perspective of subjecting the glass substrate to chemical strengthening, the content of $Al_2O_3$ desirably falls within a range of 5 to 20 percent.

$Li_2O$ is a component that raises the rigidity of the glass. Based on the ease of displacement within glass of alkali metals, the order is Li>Na>K. Thus, from the perspective of chemical strengthening performance, the incorporation of Li is advantageous. However, the incorporation of an excessive quantity invites a decrease in heat resistance. Thus, the quantity incorporated is set to equal to or less than 4 percent. That is, the content of $Li_2O$ is greater than 0 percent but equal to or less than 4 percent. From the perspectives of high rigidity, high heat resistance, and chemical strengthening performance, the content of $Li_2O$ desirably falls within a range of 0.1 to 3.5 percent, preferably within a range of 0.1 to 3 percent, more preferably within a range of 0.2 to 3 percent, still more preferably within a range of 0.5 to 3 percent, yet more preferably within a range of more than 1 percent but equal to or less than 3 percent, and yet still more preferably, within a range of more than 1 percent but equal to or less than 2.5 percent.

Further, as set forth above, the introduction of an excessive quantity of $Li_2O$ invites a drop in heat resistance. However, when the quantity incorporated becomes excessive relative to $Na_2O$, heat resistance may decrease. Thus, the quantity incorporated is adjusted relative to the quantity of $Na_2O$ incorporated so that the molar ratio of the $Li_2O$ content relative to the $Na_2O$ content ($Li_2O/Na_2O$) falls within a range of less than 0.50. From the perspective of inhibiting the drop in heat resistance while achieving the effect of incorporating $Li_2O$, the above molar ratio ($Li_2O/Na_2O$) desirably falls within a range of equal to or greater than 0.01 to less than 0.50, preferably within a range of 0.02 to 0.40, more preferably within a range of 0.03 to 0.40, still more preferably within a range of 0.04 to 0.30, and yet still more preferably, within a range of 0.05 to 0.30.

Additionally, even when the incorporation of $Li_2O$ is excessive relative to the combined content of alkali metal oxides ($Li_2O+Na_2O+K_2O$), heat resistance may decrease. The incorporation of an excessively small amount invites a drop in chemical strengthening performance. Thus, the quantity of $Li_2O$ incorporated is desirably adjusted relative to the combined quantity of alkali metal oxides so that the molar ratio of the content of $Li_2O$ to the combined content of alkali metal oxides ($Li_2O/(Li_2O+Na_2O+K_2O)$) falls within a range of less than ⅓. From the perspective of inhibiting a drop in heat resistance while achieving an effect by incorporating $Li_2O$, the upper limit of the molar ratio ($Li_2O/(Li_2O+Na_2O+K_2O)$) is preferably 0.30, more preferably 0.28, and still more preferably, 0.23. From the perspective of inhibiting a drop in chemical strengthening performance, the lower limit of the molar ratio ($Li_2O/(Li_2O+Na_2O+K_2O)$) is desirably 0.01, preferably 0.02, more preferably 0.03, still more preferably 0.04, and yet still more preferably, 0.05.

$Na_2O$ is a component that effectively enhances thermal expansion characteristics, so equal to or greater than 1 percent is incorporated. Since $Na_2O$ is also a component that contributes to chemical strengthening performance, the incorporation of equal to or greater than 1 percent is advantageous from the perspective of chemical strengthening performance. However, the incorporation of a quantity of equal to or greater than 15 percent invites a drop in heat resistance. Accordingly, the content of $Na_2O$ is set to equal to or greater than 1 percent but less than 15 percent. From the perspectives of thermal expansion characteristics, heat resistance, and chemical strengthening performance, the content of $Na_2O$ desirably falls within a range of 4 to 13 percent, preferably within a range of 5 to 11 percent.

$K_2O$ is a component that effectively enhances thermal expansion characteristics. The incorporation of an excessive quantity invites a drop in heat resistance and thermal conductivity, and chemical strengthening performance also deteriorates. Thus, the quantity incorporated is set to less than 3 percent. That is, the content of $K_2O$ is equal to or greater than 0 percent but less than 3 percent. From the perspectives of enhancing the thermal expansion characteristic while maintaining heat resistance, the $K_2O$ content desirable falls within a range of 0 to 2 percent, preferably within a range of 0 to 1 percent, more preferably within a range of 0 to 0.5 percent, and still more preferably, within a range of 0 to 0.1 percent. From the perspectives of heat resistance and chemical strengthening performance, the incorporation of substantially none at all is desirable. In the present invention, the terms "substantially not containing" and "substantially not incorporated" means that a specific component is not intentionally added in the glass starting materials, but does not exclude mixing in as an impurity. The same applies to the indication of 0 percent relating to the glass composition.

When the combined content of alkali metal oxides selected from the group consisting of $Li_2O$, $Na_2O$, and $K_2O$ is less than 6 percent, the meltability and thermal expansion characteristics of the glass deteriorate. When the content exceeds 15 percent, the heat resistance decreases. Accordingly, from the perspectives of the meltability, heat expansion characteristics, and heat resistance of the glass, the combined content of alkali metal oxides selected from the group consisting of $Li_2O$, $Na_2O$, and $K_2O$ is set to 6 to 15 percent, desirably 7 to 15 percent, preferably to 8 to 13 percent, and more preferably, to within a range of 8 to 12 percent.

Glass A, which is being given as an example, substantially contains no BaO. The reasons for not incorporating BaO are given below.

To increase recording density, it is necessary to decrease the distance between the magnetic head and the surface of the magnetic recording medium and impart reading and writing resolution. To that end, reduction in the height at which the head flies (reduction in the spacing between the magnetic head and the surface of the magnetic recording medium) has been progressing. As a result, the presence of even the slight protrusions on the surface of the magnetic recording medium is no longer permitted. That is because even minute protrusions collide with the head, damage the head, and the like in low-flying recording and reproduction systems. Additionally, BaO reacts with carbonic acid gas in the atmosphere, producing $BaCO_3$, which adheres to the surface of the glass substrate. Accordingly, from the perspective of reducing adhering material, no BaO is incorporated. In addition, BaO modifies the glass surface (referred to as "burning"), and is thus a component that presents the risk of forming minute protrusions on the substrate surface. Thus, to prevent burning of the glass surface, BaO is excluded. Being Ba-free is also desirable to reduce the burden on the environment.

Additionally, the glass substrate containing substantially no BaO is desirable in a magnetic recording medium in which a heat-assisted recording method is employed. The reasons for this are as follows.

The higher the recording density, the smaller the bit size employed. For example, the target value of the bit size for achieving high density recording exceeding one terabyte/$inch^2$ is a diameter of several tens of nanometers. When recording at such a minute bit size, the area that is heated in heat-assisted recording must be about the same as the bit size. To conduct high-speed recording at a minute bit size, the time that is expended on recording a single bit becomes extremely short. Thus, heat-assisted heating and cooling must be instantaneously completed. That is, the heating and cooling of a magnetic recording medium that is employed in heat-assisted recording must be conducted in as rapid and localized a fashion as possible.

Accordingly, the positioning of a heat sink layer comprised of a highly thermoconductive material (such as a Cu film) between the substrate and the magnetic recording layer of a magnetic recording medium for heat-assisted recording has been proposed (for example, see Japanese Unexamined Patent Publication (KOKAI) No. 2008-52869, which is expressly incorporated herein by reference in its entirety). The heat sink layer prevents heat diffusion in in-plane directions and accelerates the flow of heat in the vertical (depth) direction, thereby serving as a layer that causes heat applied to the recording layer to escape not in an in-plane direction, but in the vertical (thickness) direction. The thicker the heat sink layer is made, the more rapidly and more localized the fashion in which heat and cooling can be implemented. However, the formation of a thick heat sink layer requires a long film formation period, compromising productivity. Increasing the thickness of the heat sink layer also increases the amount of heat accumulating during film formation, effectively disrupting the crystallinity and crystal orientation of the magnetic layer formed over it and sometimes making it difficult to improve recording density. Further, the thicker the heat sink layer becomes, the greater the possibility that corrosion will occur in the heat sink layer, causing the film as a whole to mound up and generate convex defects and hindering a low flotation level. When iron materials are employed in the heat sink layer, in particular, the potential of this phenomenon occurring is high.

Providing a thick heat sink layer as set forth above affords advantages in terms of achieving rapid and localized heating and cooling, but is undesirable from the perspectives of productivity, increasing recording density, and reducing the flotation level. As a countermeasure, it is conceivably possible to increase the thermoconductivity of the glass substrate to complement the role of the heat sink layer.

In this context, glass A is comprised of components in the form of $SiO_2$, $Al_2O_3$, alkali metal oxides, alkaline earth metal oxides, and the like. Among these, the alkali metal oxides and alkaline earth metal oxides function as modifying components to improve the meltability of the glass and increase its coefficient of thermal expansion. Accordingly, they must be incorporated into the glass in certain quantities. Among them, Ba, which has the highest atomic number, has the greatest effect in lowering the thermoconductivity of a glass. Since no BaO is contained, there is no reduction in thermoconductivity due to BaO. Accordingly, even with a thin heat sink layer, heating and cooling can be conducted in rapid and localized fashion.

Among the alkaline earth metal oxides, BaO functions to maintain the highest glass transition temperature. The molar ratio $\{(MgO+CaO)/(MgO+CaO+SrO)\}$ of the total content of MgO and CaO to the total content of MgO, CaO, and SrO is set to equal to or more than 0.86 so as to prevent a decrease in the glass transition temperature due to not employing BaO. This is because for a given total quantity of alkaline earth metal oxides, it is possible to maintain a higher glass transition temperature by using a blend that concentrates the total quantity in one or two alkaline earth metal oxides than by means of a blend employing multiple alkaline earth metal oxides. That is, it is possible to suppress the drop in the glass transition temperature due to not employing BaO by setting the above molar ratio to equal to or more than 0.86. As set forth above, one of the characteristics required of a glass substrate is high rigidity (high Young's modulus). A low specific gravity is another characteristic that is desirable in a glass substrate, as set forth further below. To achieve a high Young's modulus and a low specific gravity, alkaline earth metal oxides in the form of MgO and CaO are advantageously incorporated with preference. Accordingly, keeping the above molar ratio to equal to or more than 0.86 also has the effect of achieving a high Young's modulus and a low specific gravity in the glass substrate. From the above-described perspectives, the above molar ratio is desirably equal to or more than 0.88, preferably equal to or more than 0.90, more preferably equal to or more than 0.93, still more preferably equal to or more than 0.95, even more preferably equal to or more than 0.97, yet more preferably equal to or more than 0.98, yet still more preferably equal to or more than 0.99, and optimally, 1.

When the total content of alkaline earth metal oxides selected from the group consisting of MgO, CaO, and SrO is excessively low, the rigidity and thermal expansion characteristic of the glass decrease; when excessively high, chemical durability drops. To achieve high rigidity, high thermal expansion characteristic, and good chemical durability, the total content of the above alkaline earth metal oxides is set to 10 to 30 percent, desirably 10 to 25 percent, preferably to 11 to 22 percent, more preferably to 12 to 22 percent, still more preferably to 13 to 21 percent, and yet still more preferably, to within a range of 15 to 20 percent.

As set forth above, MgO and CaO are components that are preferentially incorporated in a total content of 10 to 30 percent. When the total content of MgO and CaO is less than 10 percent, rigidity and the thermal expansion characteristic decrease. When it exceeds 30 percent, chemical durability drops. From the perspective of achieving a good effect by preferentially incorporating MgO and CaO, the range of the total content of MgO and CaO is desirably 10 to 25 percent, preferably 10 to 22 percent, more preferably 11 to 20 percent, and still more preferably, 12 to 20 percent.

Further, among the alkaline metal oxides, $K_2O$ has a high atomic number, functions to greatly lower thermal conductivity, and is disadvantageous from the perspective of the chemical strengthening property. Thus, the content of $K_2O$ is limited with respect to the total content of alkali metal oxides. The molar ratio $\{K_2O/(Li_2O+Na_2O+K_2O)\}$ of the $K_2O$ content to the total content of the alkali metal oxides is set to equal to or lower than 0.13. From the perspectives of the chemical strengthening property and thermal conductivity, this molar ratio is desirably equal to or lower than 0.10, preferably equal to or lower than 0.08, more preferably equal to or lower than 0.06, still more preferably equal to or lower than 0.05, even more preferably equal to or lower than 0.03, yet even more preferably equal to or lower than 0.02, yet still more preferably equal to or lower than 0.01, and optimally, substantially zero. That is, $K_2O$ is optimally not incorporated.

The total content $(Li_2O+Na_2O+K_2O+MgO+CaO+SrO)$ of the alkali metal oxides and the alkaline earth metal oxides is 20 to 40 percent. This is because at less than 20 percent, glass meltability, the coefficient of thermal expansion, and rigidity decrease, and at greater than 40 percent, chemical durability and resistance to heat diminish. From the perspective of maintaining various characteristics described above in a good level, the total content of the alkali metal oxides and alkaline earth metal oxides desirably falls within a range of 20 to 35 percent, preferably within a range of 21 to 33 percent, and more preferably, within a range of 23 to 33 percent.

As set forth above, MgO, CaO, and $Li_2O$ are effective components for achieving high glass rigidity (a high Young's modulus). When the total of these three components is excessively low relative to the total of the alkali metal oxides and alkaline earth metal oxides, it becomes difficult to achieve a high Young's modulus. Accordingly, in glass A, the total content of MgO, CaO, and $Li_2O$ incorporated is adjusted relative to the total content of the alkali metal oxides and alkaline earth metal oxides to achieve a molar ratio $\{(MgO+CaO+Li_2O)/(Li_2O+Na_2O+K_2O+MgO+CaO+SrO)\}$ of MgO, CaO, and $Li_2O$ to the total content of the alkali metal oxides and alkaline earth metal oxides of equal to or more than 0.50. To achieve a glass substrate with an even higher Young's modulus, this molar ratio is desirably equal to or more than 0.51, preferably equal to or more than 0.52. From the perspective of glass stability, this molar ratio is desirably equal to or less than 0.80, preferably equal to or less than 0.75, and more preferably, equal to or less than 0.70.

As regards the quantity of individual alkaline earth metal oxides incorporated, BaO is substantially not incorporated, as set forth above.

From the perspectives of raising the Young's modulus, lowering the specific gravity, and thus enhancing the specific modulus of elasticity, the quantity of MgO incorporated in an embodiment is desirably 0 to 14 percent, preferably 0 to 10 percent, more preferably 0 to 8 percent, still more preferably 0 to 6 percent, and yet still more preferably, falls within a range of 1 to 6 percent. In another embodiment, the quantity incorporated is desirably 8 to 30 percent, preferably 8 to 25 percent, more preferably 8 to 22 percent, still more preferably 10 to 22 percent, and yet still more preferably, falls within a range of 12 to 20 percent. The specific modulus of elasticity will be described farther below.

From the perspectives of enhancing the thermal expansion characteristics, raising the Young's modulus, and lowering the specific gravity, the quantity of CaO incorporated in an embodiment is desirably 3 to 20 percent, preferably 4 to 20 percent, and more preferably, falls within a range of 10 to 20 percent. In another embodiment, the quantity incorporated is desirably 0 to 9 percent, preferably 0 to 5 percent, more preferably 0 to 2 percent, still more preferably 0 to 1 percent, and yet still more preferably, falls within a range of 0 to 0.8 percent.

Although SrO is a component that enhances the thermal expansion characteristics, it increases the specific gravity more than MgO and CaO. Thus, the quantity incorporated is desirably equal to or less than 4 percent, preferably equal to or less than 3 percent, more preferably equal to or less than 2.5 percent, still more preferably equal to or less than 2 percent, and yet still more preferably, equal to or less than 1 percent. It is also possible to substantially incorporate none at all.

To obtain a high glass transition temperature, from the perspective of a mixed alkaline earth effect, it is desirable to add just one alkaline earth metal oxide instead of multiple alkaline earth metal oxides. When adding multiple types, they can be selected so that the proportion of the alkaline earth metal oxide added in the greatest quantity is equal to or greater than 70 percent, preferably equal to or greater than 80 percent, more preferably equal to or greater than 90 percent, and still more preferably, equal to or greater than 95 percent of the total quantity of alkaline earth metal oxides.

The contents and proportions of $SiO_2$, $Al_2O_3$, alkali metal oxides, and alkaline earth metal oxides are as set forth above. Glass A exemplified also contains the oxide components indicated below. They will be described in detail below.

Oxides selected from the group consisting of $ZrO_2$, $TiO_2$, $Y_2O_3$, $La_2O_3$, $Gd_2O_3$, $Nb_2O_5$, and $Ta_2O_5$ are components that increase rigidity and heat resistance. Thus, at least one is incorporated. However, the incorporation of an excessive quantity reduces the meltability and thermal expansion characteristics of the glass. Accordingly, the total content of the above oxides is set to more than 0 percent but equal to or less than 10 percent, desirably falling within the range of 1 to 10 percent. The upper limit of the combined content of the above oxides is preferably 9 percent, more preferably 8 percent, still more preferably 7 percent, yet more preferably 6 percent, yet still more preferably 3.5 percent, and further preferably, 3 percent. Additionally, the lower limit of the combined content of the above oxides is preferably 1.5 percent, more preferably 2 percent. In an embodiment, the combined content of the above oxides is preferably 2 to 10 percent, more preferably 2 to 9 percent, still more preferably 2 to 7 percent, and yet still more preferably, falls within a range of 2 to 6 percent.

As set forth above, $Al_2O_3$ is also a component that increases rigidity and heat resistance. However, the above oxides function more strongly to raise the Young's modulus. In glass A-1, the above oxides are incorporated in a molar ratio of equal to or greater than 0.4 relative to $Al_2O_3$. That is, by making the molar ratio of the combined content of the above oxides to the content of $Al_2O_3$ (($ZrO_2+TiO_2+Y_2O_3+La_2O_3+Gd_2O_3+Nb_2O_5+Ta_2O_5$)/$Al_2O_3$) equal to or greater than 0.40, it is possible to enhance rigidity and heat resistance. From the perspective of further raising rigidity and heat resistance, the above molar ratio is desirably equal to or higher than 0.50, preferably equal to or higher than 0.60, and more preferably, equal to or higher than 0.70. From the perspective of the stability of the glass, the above molar ratio is desirably equal to or lower than 4.00, preferably equal to or lower than 3.00, more preferably equal to or lower than 2.00, still more preferably equal to or lower than 1.00, yet more preferably equal to or lower than 0.90, and yet still more preferably, equal to or lower than 0.85.

$B_2O_3$ is a component that reduces the brittleness of the glass substrate and enhances the meltability of the glass. However, when introduced in excessive quantity, it decreases resistance to heat. Thus, the quantity incorporated is desirably 0 to 3 percent, preferably 0 to 2 percent, more preferably more than 0 percent but less than 1 percent, and still more preferably, 0 to 0.5 percent. It is also possible to incorporate substantially none.

$Cs_2O$ is a component that can be introduced in small quantities to the extent that it does not compromise desired characteristics and properties. However, it is a component that increases the specific gravity more than other alkali metal oxides, and can thus substantially not be incorporated.

ZnO is a component that improves the meltability, moldability, and stability of the glass; increases rigidity; and enhances the thermal expansion characteristics. However, when incorporated in excessive quantity, it compromises heat resistance and chemical durability. Thus, the quantity incorporated is desirably 0 to 3 percent, preferably 0 to 2 percent, and more preferably, 0 to 1 percent. It can also substantially not be incorporated.

$ZrO_2$ is a component that increases rigidity and heat resistance, as set forth above, and chemical durability. However, when incorporated in excessive quantity, it compromises the meltability of the glass. Thus, in an embodiment, the quantity incorporated is desirably greater than 0 percent but equal to or less than 10 percent, preferably 1 to 10 percent. The upper limit of the content of $ZrO_2$ is preferably 9 percent, more preferably 8 percent, still more preferably 7 percent, yet still more preferably 6 percent, even more preferably 3.5 percent, and yet even more preferably, 3 percent. The lower limit of content of $ZrO_2$ is desirably 1.5 percent, preferably 2 percent. In another embodiment, the quantity of $ZrO_2$ incorporated is desirably 1 to 8 percent, preferably 1 to 6 percent, and more preferably, 2 to 6 percent.

$TiO_2$ is a component that inhibits an increase in the specific gravity of the glass, has the effect of increasing rigidity, and thus can raise the specific modulus of elasticity. However, when incorporated in excessive quantity and water comes into contact with the glass substrate, this component sometimes causes reaction products to form with the water on the substrate surface, generating materials that adhere. Thus, the quantity incorporated is desirably 0 to 6 percent, preferably 0 to 5 percent, more preferably 0 to 3 percent, still more preferably 0 to 2 percent, and yet still more preferably, equal to or greater than 0 percent but less than 1 percent. It is also possible to substantially incorporate none.

$Y_2O_3$, $Yb_2O_3$, $La_2O_3$, $Gd_2O_3$, $Nb_2O_5$, and $Ta_2O_5$ are advantageous components from the perspectives of improving chemical durability, heat resistance, rigidity, and fracture toughness. However, when incorporated in excessive quantities, they compromise meltability and increase the specific gravity. Since they entail the use of expensive starting materials, their content is desirably kept low. Accordingly, the combined quantity of the above components that is incorporated is desirably 0 to 3 percent, preferably 0 to 2 percent, more preferably 0 to 1 percent, still more preferably 0 to 0.5 percent, and yet more preferably, 0 to 0.1 percent. When putting importance on improved meltability, low specific gravity, and cost reduction, they are desirably substantially not incorporated.

$HfO_2$ is also an advantageous component from the perspectives of enhancing chemical durability, heat resistance, rigidity, and fracture toughness. However, when incorporated in excessive quantity, meltability deteriorates and the specific gravity increases. It also entails the use of expensive starting materials. Thus, the content thereof is desirably kept low, and it is desirably substantially not incorporated.

Pb, As, Cd, Te, Cr, Tl, U, and Th are desirably substantially not employed in consideration of their effects on the environment.

From the perspective of enhancing meltability while increasing heat resistance, the molar ratio of the combined content of $SiO_2$, $Al_2O_3$, $ZrO_2$, $TiO_2$, $Y_2O_3$, $La_2O_3$, $Gd_2O_3$, $Nb_2O_5$, and $Ta_2O_5$ to the combined content of the above alkali metal oxides ($Li_2O$, $Na_2O$, and $K_2O$) (($SiO_2+Al_2O_3+ZrO_2+TiO_2+Y_2O_3+La_2O_3+Gd_2O_3+Nb_2O_5+Ta_2O_5$)/($Li_2O+Na_2O+K_2O$)) desirably falls within a range of 3 to 15, preferably 3 to 12, more preferably 4 to 12, still more preferably 5 to 12, yet more preferably 5 to 11, and yet still more preferably, falls within a range of 5 to 10.

Glass A having the composition given by way of example above can be chemically strengthened.

(Glass Manufacturing Method)

The glass for a magnetic recording medium substrate according to an aspect of the present invention can be obtained, for example, by weighing out starting materials such as oxides, carbonates, nitrates, and hydroxides in a manner calculated to yield the glass of the above composition; mixing to obtain a blended starting material; charging the blended starting material to a melting vessel; heating to within a range of 1,400 to 1,600° C.; melting, clarifying, and stirring the mixture to remove bubbles and unmelted material and obtain a homogenous glass melt; and molding the glass melt. The glass melt can be molded by the press molding method, casting method, float method, overflow down draw method, or the like. In the press molding method, the glass melt can be pressed and molded into a disk shape, making this method suitable for molding blanks for use as magnetic recording media substrates.

Among press molding methods, the method of causing a quantity of glass melt corresponding to one substrate blank to drop down and press molding the glass melt in the air is desirable. In this method, the glass melt in the air is sandwiched and pressed by a pair of pressing molds. Thus, the glass can be uniformly cooled through the surfaces that come into contact with the various pressing molds, allowing the manufacturing of a substrate blank of good flatness.

(Chemically Strengthened Glass)

The glass for a magnetic recording medium substrate according to an aspect of the present invention is suitable as glass for chemical strengthening.

Since adjustment of the above-described composition imparts good chemical strengthening performance, an ion-exchange layer can be readily formed in the outer surface of the glass by a chemical strengthening treatment, forming an ion-exchange layer over part or all of the outer surface. The ion-exchange layer can be formed by bringing an alkali salt into contact with the substrate surface under high temperature and causing the alkali metal ions in the alkali salt to exchange with the alkali metal ions in the substrate.

In the usual ion exchange, an alkali nitrate is heated to obtain a salt melt, and the substrate is immersed in the salt melt. When the alkali metal ions with small ion radii in the substrate are replaced with the alkali metal ions of larger ion radii in the salt melt, a compressive stress layer is formed in the surface of the substrate. That increases the fracture toughness of the magnetic recording medium-use glass substrate, making it possible to increase reliability.

Chemical strengthening can be conducted by immersing the glass, that may be preprocessed as needed, in a mixed salt melt containing, for example, a sodium salt and a potassium salt. Sodium nitrate is desirably employed as the sodium salt and potassium nitrate as the potassium salt. The glass for a magnetic recording medium substrate of the present invention contains $Li_2O$ as an essential component as set forth above, so the ion exchange is desirably conducted with Na and K, which have large ion radii than Li.

The quantity of alkali leaching out of the chemically strengthened glass surface can also be reduced by ion exchange. In the case of chemical strengthening, the ion exchange is desirably conducted within a temperature range that is higher than the strain point of the glass constituting the substrate, lower than the glass transition temperature, and in which the alkali salt melt does not undergo thermal decomposition. The fact that an ion-exchange layer is present in the substrate can be confirmed by the method of observing a cross section of the glass (a plane cutting through the ion-exchange layer) by the Babinet method, by the method of measuring the concentration distribution in the direction of depth of the alkali metal ions from the surface of the glass, and the like.

The strengthening treatment temperature (temperature of the salt melt) and the strengthening processing time (the time during which the glass is immersed in the salt melt) can be suitably adjusted. For example, the range of the strengthening treatment temperature can be adjusted with 400 to 570° C. as a goal. The range of the strengthening processing time can be adjusted with 0.5 to 10 hours as a goal, desirably with 1 to 6 hours as a goal.

Since the glass transition temperature, thermal expansion coefficient, Young's modulus, specific modulus of elasticity, specific gravity, and spectral transmittance are values that remain nearly constant before and after chemical strengthening, the various characteristics of the thermal expansion coefficient, Young's modulus, specific modulus od elasticity, specific gravity, and spectral transmittance before and after chemical strengthening are treated as identical values in the present invention. The glass in an amorphous state maintains an amorphous state after chemical strengthening.

The glass for a magnetic recording medium substrate according to an aspect of the present invention can exhibit the stress profile set forth above when subjected to chemical strengthening, thereby preventing the occurrence of delayed fracturing. Accordingly, the glass substrate for a magnetic recording medium of the present invention that is obtained by chemically strengthening the glass according to an aspect of the present invention is a glass substrate that tends not to undergo delayed fracturing, and has high heat resistance and good mechanical strength. It can exhibit the various advantages of the glass obtained by chemically strengthening the above-described glass for a magnetic recording medium substrate.

The magnetic recording medium substrate according to an aspect of the present invention can be a glass substrate comprised of chemically strengthened glass in which a tensile stress distribution is convex in shape such that the convex shape does not contain indentations indenting to a compressive stress side in a stress profile in a virtual cross section perpendicular to two main surfaces as obtained by the Babinet method. The stress profile is as set forth above. By exhibiting such a stress profile, it is possible to prevent the generation of delayed fractures. For example, when the depth from the main surface is denoted by x in the virtual cross section, the stress value S(x) at depth x is called the stress profile. The stress profile is normally linearly symmetric at the center between the two main surfaces. To determine the stress profile, it suffices to fracture the glass substrate perpendicularly to the two main surfaces and observe the fracture plane by the Babinet method.

As an example of a desirable stress profile, the compressive stress value becomes a maximum in the vicinity of the two main surfaces, and the compressive stress value decreases as depth x increases. At depths beyond depth $x_0$, which is where the compressive stress and the tensile stress balance out, the compressive stress turns into tensile stress, and the tensile stress gradually increases, reaching a peak value at or in the vicinity of the midpoint between the two main surfaces. As shown in FIG. 1, the peak value will sometimes be maintained over a fixed region in the direction of depth. In a glass substrate that adopts such a stress profile, even if the depth of a crack that occurs on the substrate surface were to exceed $x_0$, it would be possible to prevent delayed fracturing where tensile stress causes the crack to grow rapidly to where fracturing occurs.

The magnetic recording medium substrate according to an aspect of the present invention can be a glass substrate comprised of a chemically strengthened glass in which an average value Tav of a tensile stress obtained by the Babinet method and a maximum value Tmax of the tensile stress satisfy the following expression (1):

$$Tav/Tmax \geq 0.5.$$

Figure 3:
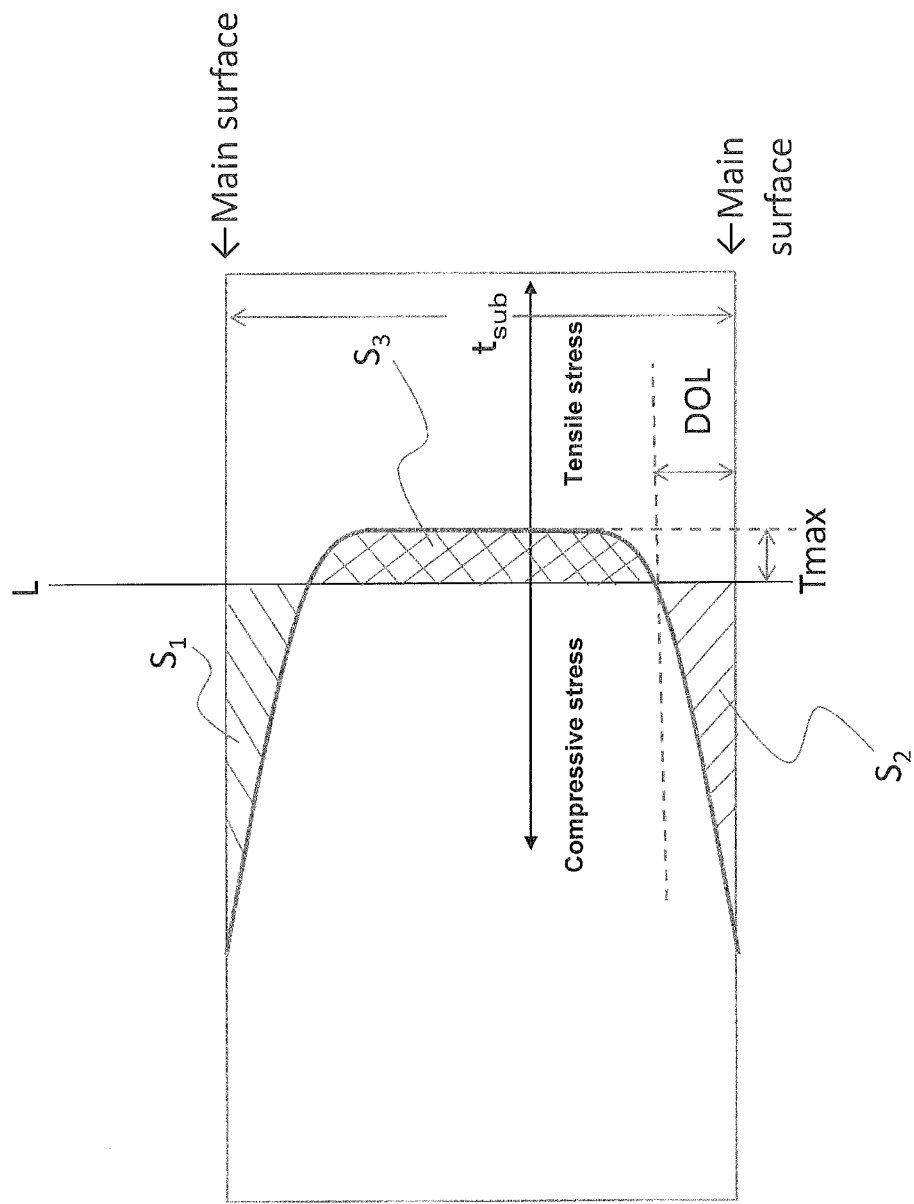
FIG. 3 is a descriptive drawing of expression (1)
Figure 4:
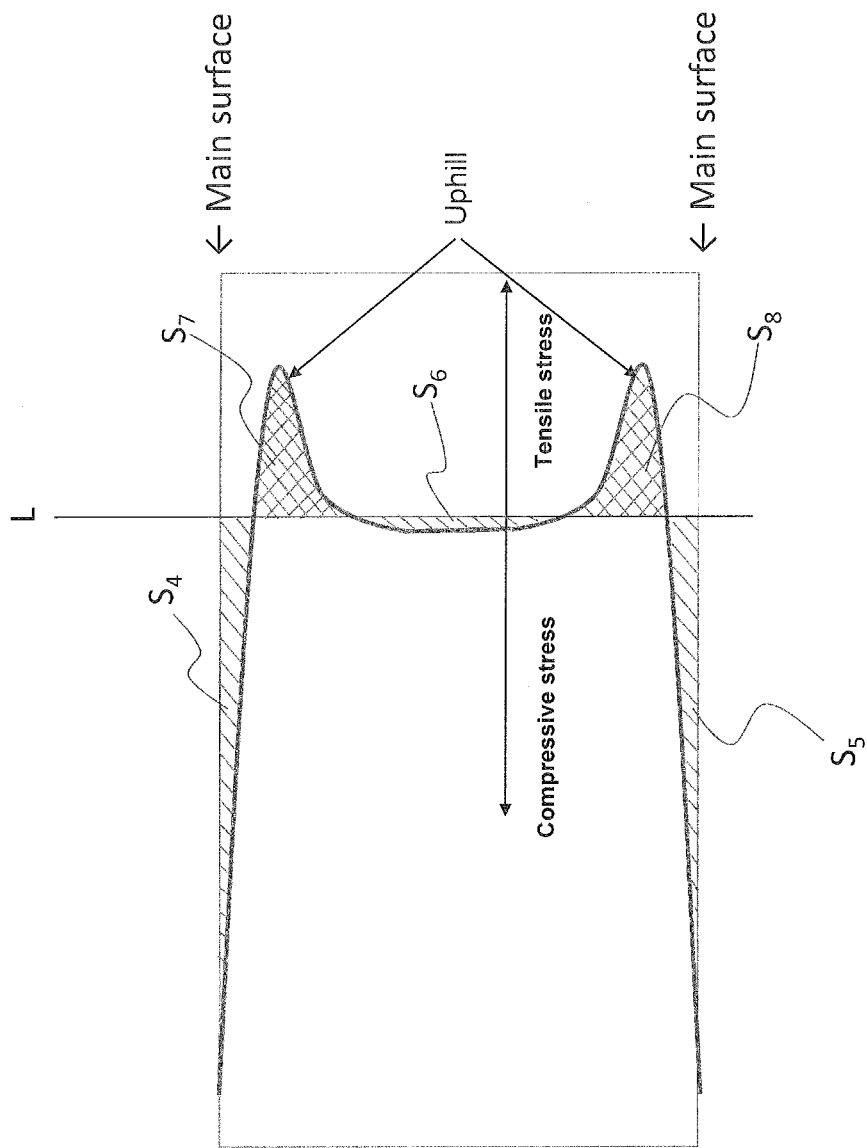
FIG. 4 is a descriptive drawing of expression (1)

Expression (1) will be described below based on FIGS. 3 and 4.

Maximum value Tmax of the tensile stress is the peak value of the above tensile stress. In FIG. 3, the average value Tv of the tensile stress, line L—the centerline of the tensile stress and the compressive stress—is determined such that surface areas $S_1$, $S_2$, and $S_3$ satisfy $S_1+S_2=S_3$. Denoting the distance from the point of intersection of a virtual straight line parallel to the main surface on the $S_2$ side and a virtual line perpendicular to the two main surfaces and passing through Tmax to the main surface on the $S_2$ side as DOL, the average value Tav of the tensile stress is given by $Tav=S_3/(tsub-2 \times DOL)$.

It is satisfied that $Tav/Tmax \geq 0.5$, desirable that $Tav/Tmax \geq 0.7$, and preferable that $Tav/Tmax \geq 0.8$. The upper limit of Tav/Tmax can be, for example, $Tav/Tmax < 1.0$.

Tav/Tmax, specified by expression (1), can be employed as an indicator that no uphill, such as that shown in FIG. 2 and described above, is present. A glass substrate in which an uphill is present will have a large Tmax, making $Tav/Tmax < 0.5$. By contrast, no uphill will be present in a glass satisfying expression (1), so the generation of delayed fractures will be inhibited.

As shown in FIG. 2, in a glass substrate in which uphills are present, line L will be determined such that surface areas $S_4$, $S_5$, $S_6$, $S_7$, and $S_8$ satisfy $S_4+S_5+S_6=S_7+S_8$. Tav is then calculated as $Tav=(S_7+S_8-S_6)/(tsub-2\times DOL)$. In FIG. 2, the tensile stress layer is divided into the two layers of $S_7$ and $S_8$ by $S_6$. As shown in FIG. 1, when the tensile stress layer is comprised of a single layer, Tav can be calculated as $Tav=S_3/(tsub-2\times DOL)$, as set forth above.

A further aspect of the present invention relates to:

a magnetic recording medium substrate blank comprised of the glass for a magnetic recording medium substrate according to an aspect of the present invention; and a method of manufacturing a magnetic recording medium comprising processing the above magnetic recording medium substrate blank.

In this connection, the magnetic recording medium substrate blank (referred to as the "substrate blank", hereinafter) means a substrate-use glass base material prior to finishing into a glass substrate for a magnetic recording medium by processing. The composition, characteristics, and desirable ranges of the composition and characteristics of the glass constituting the substrate blank are as set above.

Since the glass substrate for a magnetic recording medium is disk-shaped, the substrate blank according to an aspect of the present invention is desirably disk-shaped.

The substrate blank can be fabricated by blending glass starting materials in a manner calculated to yield the above glass; melting them to obtain a glass melt; molding the glass melt thus fabricated into sheet form by any method such as press molding, the down draw method, or the float method; and processing the glass sheet obtained as needed.

In the press molding method, an outflowing glass melt is cut to obtain a desired molten glass gob. The molten glass gob is press molded in a pressing mold to fabricate a thin, disk-shaped substrate blank.

A further aspect of the present invention relates to a magnetic recording medium having a magnetic recording layer on a magnetic recording medium substrate according to an aspect of the present invention.

The magnetic recording medium according to an aspect of the present invention will be described in greater detail below.

For example, the magnetic recording medium according to an aspect of the present invention can be a disk-shaped magnetic recording medium (called as a magnetic disk, hard disk, or the like) having a structure sequentially comprised of, moving outward from the main surface, at least an adhesive layer, an undercoat layer, a magnetic layer (magnetic recording layer), a protective layer, and a lubricating layer laminated on the main surface of a glass substrate.

For example, the glass substrate is introduced into a film-forming device within which a vacuum has been drawn, and the adhesive layer through the magnetic layer are sequentially formed on the main surface of the glass substrate in an Ar atmosphere by the DC magnetron sputtering method. The adhesive layer may be in the form of, for example, CrTi, and the undercoat layer may be in the form of, for example, CrRu. Following the forming of these films, the protective layer may be formed using $C_2H_4$ by the CVD method, for example. Within the same chamber, nitriding can be conducted to incorporate nitrogen into the surface to form a magnetic recording medium. Subsequently, for example, PFPE (polyfluoropolyether) can be coated over the protective layer by the dip coating method to form a lubricating layer.

Further, a soft magnetic layer, seed layer, intermediate layer, or the like can be formed between the undercoat layer and the magnetic layer by a known film-forming method such as sputtering method (including DC magnetron sputtering method, RF magnetron sputtering method, or the like) or vacuum vapor deposition.

Reference can be made, for example, to paragraphs [0027] to [0032] of Japanese Unexamined Patent Publication (KOKAI) No. 2009-110626, which is expressly incorporated herein by reference in its entirety. A heat sink layer comprised of a material of high thermoconductivity can be formed between the glass substrate and the soft magnetic layer, the details of which are given further below.

As set forth above, to achieve higher density recording on a magnetic recording medium, the magnetic recording layer is desirably formed of a magnetic material of high Ku. To that end, Fe—Pt-based magnetic materials, Co—Pt-based magnetic material, or Fe—Co—Pt-based magnetic materials are desirable magnetic material. In this context, the word "based" means "containing". That is, the magnetic recording medium of the present invention desirably has a magnetic recording layer containing Fe and Pt, Co and Pt, or Fe, Co, and Pt. For example, in contrast to the film-forming temperature of about 250 to 300° C. for magnetic materials that have conventionally been commonly employed, such as Co—Cr based materials, the film-forming temperature for the above magnetic material is an elevated temperature exceeding 500° C. These magnetic materials are normally subjected to a high-temperature heat (annealing) treatment at a temperature exceeding the film-forming temperature to align the crystal orientation following film formation. Accordingly, when employing an Fe—Pt based magnetic material, Co—Pt based magnetic material, or an Fe—Co—Pt based magnetic material to form the magnetic recording layer, the substrate is exposed to the above elevated temperature. When the glass constituting the substrate is one with poor heat resistance, it will deform at elevated temperature, losing its flatness. By contrast, the substrate contained in the magnetic recording medium of the present invention exhibits good heat resistance (a glass transition temperature of equal to or higher than 620° C.). Thus, even after using an Fe—Pt based magnetic material, Co—Pt based magnetic material, or Fe—Co—Pt based magnetic material to form the magnetic recording layer, the substrate can retain a high degree of flatness. The magnetic recording layer can be formed, for example, in an Ar atmosphere by forming a film of a Fe—Pt based magnetic material, Co—Pt based magnetic material, or Fe—Co—Pt based magnetic material by the DC magnetron sputtering method, and then subjecting it to a high-temperature heat treatment in a heating furnace.

The Ku (crystal magnetic anisotropy energy constant) is proportional to the coercivity Hc. "Coercivity Hc" denotes the strength of the magnetic field that reverses the magnetization. As set forth above, magnetic materials of high Ku have resistance to thermal fluctuation. Thus, they are known to be materials in which magnetized regions tend not to deteriorate due to thermal fluctuation, even when extremely minute magnetic particles are employed, and are thus suited to high-density recording. However, since Ku and Hc are proportional, as stated above, the higher the Ku, the higher the Hc. That is, the reversal of magnetization by the magnetic head tends not to occur and the writing of information becomes difficult. Accordingly, the recording method of assisting the reversal of magnetization of a magnetic material of high Ku by instantaneously applying energy to the data writing region through the head to lower the coercivity when writing information with a magnetic head has gathered attention in recent years. Such recording methods are referred to as "energy-assisted recording methods." Among them, the recording method of assisting the reversal of magnetization by irradiating a laser beam is referred to as the "heat-assisted recording method," and the recording method that provides assistance by means of microwaves is referred to as the "microwave-assisted recording method". As set forth above, an aspect of the present invention permits the formation of a magnetic recording layer with a magnetic material of high Ku. Thus, by combining a magnetic material of high Ku with energy-assisted recording, for example, it is possible to achieve high-density recording in which the surface recording density exceeds one terabyte/inch$^2$. That is, the magnetic recording medium according to an aspect of the present invention is preferably employed in an energy-assisted recording method. Heat-assisted recording methods are described in detail, for example, in IEEE Transactions on Magnetics, Vol. 44, No. 1, January 2008 119, and microwave-assisted recording methods are described in detail in, for example, IEEE Transactions on Magnetics, Vol. 44, No. 1, January 2008 125, which are expressly incorporated herein by reference in their entirety. Energy-assisted recording can also be conducted in an aspect of the present invention by the methods described in these documents.

The dimensions of the magnetic recording medium substrate (such as a glass substrate for a magnetic disk) and magnetic recording medium (such as a magnetic disk) according to an aspect of the present invention are not specifically limited. For example, the medium and the substrate can be made small because high-density recording is possible. For example, a nominal diameter of 2.5 inches is naturally possible, as are smaller diameters (such as 1 inch and 1.8 inches), or dimensions such as 3 inches and 3.5 inches.

The method of manufacturing a magnetic recording medium substrate will be described next.

First, glass starting materials such as oxides, carbonates, nitrates, sulfates, and hydroxides are weighed out in a manner calculated to yield the desired glass composition and blended. The blend is thoroughly mixed; heated and melted in a melting vessel at a range of 1,400 to 1,600° C., for example; and clarified and thoroughly stirred to remove bubbles and fabricate a homogenized glass melt free of bubbles. As needed, a clarifying agent can be added to the glass starting material based on a ratio relative to the total of the other components.

As clarifying agents, Sn oxides and Ce oxides are desirably employed as clarifying agents. The reasons for this are given below.

At elevated temperature during melting of the glass, Sn oxides tend to release oxygen gas. Minute bubbles that are contained in the glass are picked up and converted into large bubble, which tend to rise, thereby achieving a good clarifying action. Additionally, Ce oxides pick up as a glass component oxygen that is present as a gas in the glass at low temperature, thereby achieving a good clarifying action. At a bubble size of equal to or less than 0.3 mm (the size of bubbles (voids) remaining in the solidified glass), the action of Sn oxides in eliminating both relatively large bubbles and extremely small bubbles is powerful. When a Ce oxide is added in combination with an Sn oxide, the density of bubbles of about 50 μm to 0.3 mm in size is reduced to about one part in several tens. Thus, by combining an Sn oxide and a Ce oxide, it is possible to increase the glass clarifying effect over a broad temperature range from the high temperature range to the low temperature range. It is for that reason that the addition of an Sn oxide and a Ce oxide is desirable.

When the total quantity of Sn oxide and Ce oxide that is added relative to the total of the other components is equal to or greater than 0.02 mass percent, an adequate clarifying effect can be anticipated. When a substrate is prepared using glass containing even trace or small quantities of unmelted material, and the unmelted material appears on the surface of the substrate due to polishing, protrusions are generated on the substrate surface and portions where the unreacted material drops out become pits. The smoothness of the substrate surface is lost, and the substrate cannot be used in a magnetic recording medium. By contrast, when the total quantity of Sn oxide and Ce oxide added relative to the total of the other components is equal to or less than 3.5 mass percent, they can dissolve adequately into the glass and prevent the incorporation of unmelted material.

When preparing crystallized glass, Sn and Ce function to produce crystal nuclei. Since the glass according to an aspect of the present invention is amorphous glass, it is desirable not to cause crystals to precipitate by heating. When the quantities of Sn and Ce are excessive, such precipitation of crystals tends to occur. Thus, the addition of an excessive quantity of Sn oxide or Ce oxide is to be avoided.

From the above perspectives, the total quantity of Sn oxide and Ce oxide added relative to the total of the other components is desirably 0.02 to 3.5 mass percent. The total quantity of Sn oxide and Ce oxide added relative to the total of the other components preferably falls within a range of 0.1 to 2.5 mass percent, more preferably a range of 0.1 to 1.5 mass percent, and still more preferably, within a range of 0.5 to 1.5 mass percent.

The use of $SnO_2$ as the Sn oxide is desirable to effectively release oxygen gas from the glass melt at high temperature.

Sulfates can also be added as clarifying agents in a range of 0 to 1 mass percent relative to the total of the other components. However, they present the risk that melted material will boil over in the glass melt, causing foreign matter to increase sharply in the glass. When this boiling over is a concern, it is desirable not to incorporate sulfates. So long as the object of the present invention is not lost and a clarifying effect is achieved, clarifying agents other than those set forth above can be employed. However, the addition of As is to be avoided due to the great environmental burden it creates, as set forth above. Similarly, it is better to not employ Sb in light of the environmental burden it imposes.

The glass melt that has been prepared is molded into sheet form by a method such as press molding, the down draw method, or the float method and the sheet of glass obtained is subjected to a processing step to obtain the molded glass article in the shape of a substrate, that is, the magnetic recording medium substrate blank according to an aspect of the present invention.

In the press molding method, an outflowing glass melt is cut to obtain a desired molten glass gob. This glass gob is then press molded in a pressing mold to fabricate a thin, disk-shaped substrate blank.

In the down draw method, a watershoot-shaped molded member is used to guide the glass melt. When the glass melt reaches the two ends of the molded member, it overflows. The two glass melt flows that flow down along the molded member rejoin beneath the molded member, stretching downward to form a sheet. This method is also called the fusion method. By joining together the surfaces of the glass that has contacted the surface of the molded member, it is possible to obtain a glass sheet that is free of contact marks. Subsequently, thin, disk-shaped substrate blanks are cut out of the sheet material obtained.

In the float method, the glass melt is caused to flow out onto a float bath of molten tin or the like, and is molded into a sheet of glass as it spreads. Subsequently, thin, disk-shaped substrate blanks are cut out of the sheet material obtained.

A center hole is provided in the substrate blank thus obtained, the inner and outer circumferences thereof are processed, and the two main surfaces are lapped and polished. Next, a cleaning step comprising acid washing and alkali washing can be conducted to obtain a disk-shaped substrate.

The method of manufacturing a magnetic recording medium substrate according to an aspect of the present invention can also comprise a step of polishing a glass material with a fracture toughness value $K_{1c}$ lower than 1.3 MPa·m$^{1/2}$ and a chemical strengthening step following the polishing step.

In mechanical processing such as polishing, glasses of low fracture toughness are easier to process. Accordingly, in the method of manufacturing a magnetic recording medium substrate according to an aspect of the present invention, it is possible to readily manufacture a glass substrate with a high fracture toughness value and good impact resistance by conducting chemical strengthening to raise the fracture toughness following mechanical processing of the glass material with a fracture toughness value $K_{1c}$ lower than 1.3 MPa·m$^{1/2}$. The fracture toughness value can be kept to a desired value mainly by means of the chemical strengthening conditions. It is also possible to raise the fracture toughness value by intensifying the chemical strengthening conditions (for example, lengthening the processing period).

The fracture toughness value prior to chemical strengthening of the above glass material is desirably equal to or lower than 1.2 MPa·m$^{1/2}$, preferably equal to or lower than 1.1 MPa·m$^{1/2}$, more preferably equal to or lower than 1.0 MPa·m$^{1/2}$, still more preferably equal to or lower than 0.9 MPa·m$^{1/2}$, and yet still more preferably, equal to or lower than 0.8 MPa·m$^{1/2}$.

In the method of manufacturing a magnetic recording medium substrate according to an aspect of the present invention, an additional polishing step can be conducted following the chemical strengthening step. One desirable embodiment of the method of manufacturing a magnetic recording medium substrate according to an aspect of the present invention is a method of manufacturing a glass substrate for a magnetic recording medium, which comprises a chemical strengthening step that is characterized in that, in the chemical strengthening step, the ratio of the fracture toughness value $K_{1c}$ (after) of the glass material following chemical strengthening to the fracture toughness value $K_{1c}$ (before) of the glass material before chemical strengthening ($K_{1c}$ (after)/$K_{1c}$ (before)) is equal to or greater than 1.5. In this method, a glass material having a fracture toughness value suited to mechanical processing is chemically strengthened after mechanical processing such as polishing to increase the fracture toughness value. By making the ratio ($K_{1c}$ (after)/$K_{1c}$ (before)) equal to or greater than 1.5, or even equal to or greater than 1.7, it is possible to readily manufacture a magnetic recording medium substrate with good impact resistance. The $K_{1c}$ (before) and $K_{1c}$ (after) in the method of manufacturing a magnetic recording medium substrate according to an aspect of the present invention are fracture toughness values that are both measured for the same loads. When $K_{1c}$ (before) is measured at a load of 9.81 N (1,000 gf), $K_{1c}$ (after) is also measured at a load of 9.81 N (1,000 gf). When $K_{1c}$ (before) is measured at a load of 4.9 N (500 gf), $K_{1c}$ (after) is also measured at a load of 4.9 N (500 gf).

In the fabrication of a chemically strengthened glass substrate, the $B_2O_3$ that is contained as a glass component increases $K_{1c}$ (before) and reduces the mechanical processability prior to chemical strengthening without contributing to improving chemical strengthening performance. Thus, to obtain a glass with a high ratio of $K_{1c}$ (after)/$K_{1c}$ (before), it is desirable to limit the content of $B_2O_3$ to within a range of 0 to 3 percent, preferably to within a range of 0 to 2 percent, more preferably to within a range of equal to or greater than 0 percent but less than 1 percent, and still more preferably to within a range of 0 to 0.5 percent. Substantially not incorporating any is desirable. The fracture strength value $K_{1c}$ (before) prior to chemical strengthening is a value that is measured after the polishing step.

The magnetic recording medium substrate according to an aspect of the present invention can be comprised of a glass obtained by chemically strengthening glass with a molar ratio of the $K_2O$ content to the combined content of alkali metal oxides ($K_2O/(Li_2O+Na_2O+K_2O)$) of equal to or less than 0.13 and having a glass transition temperature of equal to or higher than 640° C. and a fracture toughness value of equal to or greater than 0.9 MPa·m$^{1/2}$.

The magnetic recording medium substrate according to an aspect of the present invention can be comprised of a glass having a glass transition temperature of equal to or higher than 620° C., a Young's modulus of equal to or greater than 80 GPa, a specific modulus of elasticity of equal to or greater than 30 MNm/kg, and a fracture toughness value of equal to or greater than 0.9 MPa·m$^{1/2}$.

Magnetic recording media that are 2.5 inches in outer diameter are normally employed in the HDDs of laptop computers. The glass substrate employed therein has conventionally been 0.635 mm in plate thickness. However, with the goals of increasing the substrate rigidity to improve the impact resistance without changing the specific modulus of elasticity, it is desirable to employ a plate thickness of equal to or greater than 0.7 mm, preferably a plate thickness of equal to or greater than 0.8 mm, for example.

The main surfaces on which the magnetic recording layer is formed desirably have the surface properties of (1) to (3) below:

(1) An arithmetic average Ra of surface roughness measured at a resolution of 512×256 pixels over an area of 1 μm×1 μm by an atomic force microscope of equal to or lower than 0.15 nm;

(2) An arithmetic average Ra of surface roughness measured over an area of 5 μm×5 μm by an atomic force microscope of equal to or lower than 0.12 nm; or (3) An arithmetic average Wa of surface undulation at wavelengths of 100 μm to 950 μm of equal to or lower than 0.5 nm.

The grain size of the magnetic recording layer that is formed on the substrate is, for example, less than 10 nm in the perpendicular recording method. When the surface roughness of the substrate surface is great, no improvement in magnetic characteristics can be anticipated even when the bit size is reduced to achieve high-density recording. By contrast, in a substrate in which the arithmetic average Ra of the two types of surface roughness of (1) and (2) are within the above-stated ranges, it is possible to improve magnetic characteristics even when the bit size is reduced to achieve high-density recording. By keeping the arithmetic average Wa of surface undulation of (3) above within the above-stated range, it is possible to improve the flying stability of the magnetic head in a HDD. Increasing the acid resistance and alkali resistance of the glass is effective for achieving a substrate having surface properties (1) to (3) above.

The magnetic recording medium according to an aspect of the present invention is called as a magnetic disk, hard disk, or the like. It is suited to application to the internal memory apparatuses (fixed disks and the like) of desktop computers, server-use computers, laptop computers, mobile computers, and the like; the internal memory apparatuses of portable recording and reproduction apparatuses that record and reproduce images and/or sound; vehicle-mounted audio recording and reproduction apparatuses; and the like. It is also particularly suited to energy-assisted recording systems, as set forth above.

The magnetic recording apparatus will be described next.

The magnetic recording apparatus according to an aspect of the present invention is a magnetic recording apparatus of energy-assisted magnetic recording system, which comprises a heat-assisted magnetic recording head having a heat source to heat at least a main surface of a magnetic recording medium, a recording element member, and a reproduction element member, and the magnetic recording medium of the present invention.

An aspect of the present invention can provide a magnetic recording apparatus of high recording density that is highly reliable by mounting the magnetic recording medium according to an aspect of the present invention.

Since the magnetic recording apparatus is equipped with a substrate of high strength, adequate reliability is afforded at a high rotational speed of equal to or greater than 5,000 rpm, desirably equal to or greater than 7,200 rpm, and preferably, equal to or greater than 10,000 rpm.

Further, a DFH (Dynamic Flying Height) head is desirably mounted in the magnetic recording apparatus to achieve high recording density.

Examples of the magnetic recording apparatus are the internal memory apparatuses (fixed disks and the like) of various computers such as desktop computers, server-use computers, laptop computers, and mobile computers; the internal memory apparatuses of portable recording and reproduction apparatuses that record and reproduce images and/or sound; and vehicle-mounted audio recording and reproduction apparatus.

EXAMPLES

The present invention is described in greater detail below through Examples. However, the present invention is not limited to the embodiments shown in Examples.

(1) Preparation of Glass Melts

Oxides, carbonates, nitrates, hydroxides, and other starting materials were weighed out and mixed in a manner calculated to yield glasses of the various compositions of Nos. 1 to 18 (Examples) shown in Tables 2 to 5 and No. 19 (Comparative Example) shown in Table 6 to obtain blended starting materials. Each of the starting materials was charged to a melting vessel, heated, melted clarified, and stirred for 3 to 6 hours within a range of 1,400 to 1,600° C. to prepare a homogeneous glass melt free of bubbles and unmelted materials. No bubbles, unmelted materials, crystal precipitation, or contaminants in the form of refractory materials constituting the melting vessel were found in the glasses Nos. 1 to 18 that were obtained.

(2) Preparation of Substrate Blanks

Next, disk-shaped substrate blanks were prepared by methods A or B below.

(Method A)

The above glass melt that had been clarified and homogenized was caused to flow out of a pipe at a constant flow rate and received in the lower mold of a pressing mold. The outflowing glass melt was cut with a cutting blade to obtain a glass melt gob of prescribed weight on the lower mold. The lower mold carrying the glass melt gob was then immediately removed from beneath the pipe. Using an upper mold facing the lower mold and a sleeve mold, the glass melt was press molded into a thin disk shape measuring 66 mm in diameter and 2 mm in thickness. The press-molded article was cooled to a temperature at which it would not deform, removed from the mold, and annealed, yielding a substrate blank. In the molding, multiple lower molds were used and the outflowing glass melt was continuously molded into disk-shaped substrate blanks.

(Method B)

The glass melt that had been clarified and homogenized was continuously cast from above into the through-holes of a heat-resistant casting mold provided with round through-holes, molded into round rods, and brought out from beneath the through holes. The glass that was brought out was annealed. The glass was then sliced at constant intervals in a direction perpendicular to the axis of the round rods using a multiwire saw to prepare disk-shaped substrate blanks.

Methods A and B were employed in the present Examples. However, methods C and D, described below, are also suitable as methods for manufacturing disk-shaped substrate blanks.

(Method C)

The above glass melt is caused to flow out onto a float bath, molded into sheet glass (molded by the floating method), and then annealed. Disk-shaped pieces of glass can be then cut from the sheet glass to obtain substrate blanks.

(Method D)

The above glass melt is molded into sheet glass by the overflow down draw method (fusion method) and annealed. Disk-shaped pieces of glass can be then cut from the sheet glass to obtain substrate blanks.

(3) Preparation of Glass Substrates

Through-holes were formed in the center of substrate blanks obtained by the various above methods. The inner and outer circumferences thereof were ground and the main surfaces of the disks were lapped and polished (polished to mirror surfaces) to finish them into magnetic disk-use glass substrates 65 mm in diameter and 0.8 mm in thickness. The glass substrates obtained were cleaned with a 1.7 mass percent hydrofluosilicic acid ($H_2SiF$) aqueous solution and a 1 mass percent potassium hydroxide aqueous solution. They were then rinsed with pure water and dried. The surfaces of the substrates prepared from the glasses of Examples were observed under magnification, revealing no surface roughness. The surfaces were smooth.

Next, the disk-shaped glass substrates were immersed in a mixed salt melt of sodium nitrate and potassium nitrate and glass substrates having an ion-exchange layer on the surfaces thereof were obtained by ion exchange (chemical strengthening). The chemical strengthening conditions are given in Tables 2 to 5. Conducting the ion-exchange processing (chemical strengthening processing) in this manner effectively enhance the impact resistance of the glass substrates. The cross sections (cut surfaces of the ion-exchange layers) of glass substrates sampled from a number of glass substrates that had been subjected to the ion-exchange treatment were observed by the Babinet method and the fact that ion-exchange layers had formed was confirmed.

The ion-exchange layer can be formed over the entire region of the glass substrate surface, formed on just the outer circumference surface, or formed on just the outer circumference surface and the inner circumference surface.

After ion-exchange processing, it is possible to conduct mirror-surface polishing in a manner that does not remove the ion-exchange layer. In this process, a portion removed in polishing processing is desirably equal to or less than 10 μm, preferably equal to or less than 5 μm. By setting the portion removed as set forth above, the ion-exchange layer can be adequately remained not to excessively lower $K_{1c}$.

(4) Formation of Magnetic Disks

The following method was used to sequentially form an adhesive layer, undercoat layer, magnetic layer, protective layer, and lubricating layer on the main surface of each of the glass substrates prepared from the glass of Examples, yielding magnetic disks.

First, a film-forming apparatus in which a vacuum had been drawn was employed to sequentially form the adhesive layer, undercoat layer, and magnetic layer in an Ar atmosphere by the DC magnetron sputtering method.

At the time, the adhesive layer was formed as an amorphous CrTi layer 20 nm in thickness using a CrTi target. Next, a single-substrate, static opposed type film-forming apparatus was employed to form a layer 10 nm in thickness comprised of CrRu as an undercoat layer by the DC magnetron sputtering method in an Ar atmosphere. Further, the magnetic layer was formed at a film forming temperature of 400° C. using an FePt or CoPt target to obtain an FePt or CoPt layer 10 nm in thickness.

The magnetic disks on which magnetic layers had been formed were moved from the film-forming apparatus into a heating furnace and annealed under the condition suitably selected within a temperature range of 650 to 700° C.

Next, a 3 nm protective layer comprised of hydrogenated carbon was formed by CVD method using ethylene as the material gas. Subsequently, PFPE (perfluoropolyether) was used to form a lubricating layer by the dip coating method. The lubricating layer was 1 nm in thickness.

The above manufacturing process yielded magnetic disks.

1. Evaluation of the Glass (1) Glass Transition Temperature Tg and Thermal Expansion Coefficient The glasses indicated in Tables 2 to 5 were processed into sheets and the glass transition temperatures Tg, average coefficient of linear expansion a at 100 to 300° C., and average coefficient of linear expansions at 500 to 600° C. of samples that had been chemically strengthened under the conditions described in Tables 2 to 5 were measured using a thermomechanical analyzer (Thermo plus TMA8310) made by Rigaku. None of the above characteristics underwent substantial change before and after the chemical strengthening processing. Thus, the glasses prior to chemical strengthening processing were also deemed to have the glass transition temperatures Tg, average coefficient of linear expansions a at 100 to 300° C., and average coefficient of linear expansions at 500 to 600° C. obtained by the above measurements.

The various characteristics of a sample of the glass indicated in Table 6 that had not been chemically strengthened were also measured in the above-described manner.

(2) Young's Modulus

The Young's modulus of samples of the glasses indicated in Tables 2 to 5 that had been processed into sheets and subjected to a chemical strengthening treatment under the conditions given in Tables 2 to 5 was measured by an ultrasonic method. Since Young's modulus did not change substantially before and after chemical strengthening treatment, the glasses prior to chemical strengthening treatment were also deemed to have the Young's moduli obtained by the above measurement.

The Young's modulus of a sample of the glass indicated in Table 6 that had not been chemically strengthened was also measured in the above-described manner.

(3) Specific Gravity

The specific gravity of samples of the glasses indicated in Tables 2 to 5 that had been processed into sheets and subjected to a chemical strengthening treatment under the conditions given in Tables 2 to 5 was measured by Archimedes' method. Since the specific gravity did not change substantially before and after chemical strengthening treatment, the glasses prior to chemical strengthening treatment were also deemed to have the specific gravity moduli obtained by the above measurement.

The specific gravity of a sample of the glass indicated in Table 6 that had not been chemically strengthened was also measured in the above-described manner.

(4) Specific Modulus of Elasticity

The specific modulus of elasticity was calculated from the Young's modulus obtained in (2) above and the specific gravity obtained in (3).

(5) Fracture Toughness

An MVK-E apparatus made by Akashi was employed. A Vickers indenter was pressed at a pressing load of 9.81 N into samples of the glasses indicated in Tables 2 to 5 that had been processed into sheets and chemically strengthened under the conditions given in Tables 2 to 5, introducing indentations and cracks into the samples.

A Vickers indenter was pressed at a pressing load of 4.9 N into samples of glasses Nos. 1 and 2 that had been subjected to chemical strengthening under the conditions described in Table 2, introducing indentations and cracks into the samples.

Loads of 9.81 or 4.9 N were applied in the same manner as set forth above to unstrengthened products of glasses Nos. 1 and 2 that had not been chemical strengthened, introducing indentations and cracks into the samples.

The Young's modulus E [GPa] of the sample, the diagonal length of the indentation, and the half-length of the surface cracks were measured, and the fracture toughness $K_{1c}$ was calculated from the load and the Young's modulus of the sample.

(6) Tav/Tmax

The glasses indicated in Tables 2 to 5 were processed into sheets and the cross-sections in the direction of plate thickness of samples that had been chemically strengthened under the conditions given in Tables 2 to 5 were observed by Babinet's method, Tmax and Tav were calculated by the above-described method, and Tav/Tmax was determined from the values that were calculated.

2. Evaluation of the Substrate (Surface Roughness, Surface Waviness)

A 5×5 μm square region of the main surface (the surface on which the magnetic recording layer and the like were deposited) of each substrate of the glasses indicated in Tables 2 to 5 before and after chemical strengthening was observed by an atomic force microscope (AFM) at a resolution of 256×256 pixels, and the arithmetic average Ra of the surface roughness as measured at a resolution of 512×256 pixels over an area of 1 μm×1 μm and the arithmetic average Ra of the surface roughness as measured over an area of 5×5 μm were measured.

The arithmetic average Wa of surface waviness at wavelengths of 100 μm to 950 μm of the main surface (surface on which the magnetic recording layer and the like were deposited) of each substrate before and after chemical strengthening was measured with an optical surface profilometer.

The arithmetic average Ra of the surface roughness measured for an area of 1 μm×1 μm ranged from 0.05 to 0.15 nm. The arithmetic average Ra of the surface roughness measured for an area of 5 μm×5 μm ranged from 0.03 to 0.12 nm. And the arithmetic average Wa of the surface waviness at wavelengths 100 μm to 950 μm was 0.2 to 0.5 nm. These ranges presented no problems for use as substrates in high recording density magnetic recording media.

TABLE 2

|  |  | No. 1 | | No. 2 | |
| --- | --- | --- | --- | --- | --- |
|  |  | mol % | mass % | mol % | mass % |
| Glass composition | $SiO_2$ | 61.00 | 59 | 60.00 | 58.1 |
|  | $Al_2O_3$ | 11.00 | 18 | 11.00 | 18.1 |
|  | $B_2O_3$ | 0.00 | 0 | 0.00 | 0 |
|  | $Li_2O$ | 1.00 | 0.5 | 1.00 | 0.5 |
|  | $Na_2O$ | 10.50 | 10.5 | 11.00 | 11 |
|  | $K_2O$ | 0.00 | 0 | 0.00 | 0 |
|  | MgO | 15.50 | 10 | 16.00 | 10.4 |
|  | CaO | 0.00 | 0 | 0.00 | 0 |
|  | SrO | 0.00 | 0 | 0.00 | 0 |
|  | BaO | 0.00 | 0 | 0.00 | 0 |
|  | ZnO | 0.00 | 0 | 0.00 | 0 |
|  | $ZrO_2$ | 1.00 | 2 | 1.00 | 2 |
|  | $TiO_2$ | 0.00 | 0 | 0.00 | 0 |
|  | Total | 100.00 | 100 | 100.00 | 100 |
|  | MgO + CaO + SrO + BaO | 15.50 | 10.0 | 16.00 | 10.4 |
|  | CaO/(MgO + CaO + SrO + BaO) | 0.00 | 0.0 | 0.00 | 0.0 |
|  | MgO/(MgO + CaO + SrO + BaO) | 1 | 1 | 1 | 1 |
|  | $Li_2O/Na_2O$ | 0.10 | 0.05 | 0.09 | 0.05 |
|  | $Li_2O/(Li_2O + Na_2O + K_2O)$ | 0.09 | 0.05 | 0.08 | 0.04 |
|  | $Li_2O + Na_2O + K_2O$ | 11.50 | 11.0 | 12.00 | 11.5 |
|  | MgO + CaO + SrO | 15.50 | 10.0 | 16.00 | 10.4 |
|  | MgO + CaO | 15.50 | 10.0 | 16.00 | 10.4 |
|  | (MgO + CaO)/(MgO + CaO + SrO) | 1 | 1 | 1 | 1 |
|  | $K_2O/(Li_2O + Na_2O + K_2O)$ | 0 | 0 | 0 | 0 |
|  | $Li_2O + Na_2O + K_2O + MgO + CaO + SrO$ | 27.00 | 21.0 | 28.00 | 21.9 |
|  | $(MgO + CaO + Li_2O)/(Li_2O + Na_2O + K_2O + MgO + CaO + SrO)$ | 0.61 | 0.50 | 0.61 | 0.50 |
|  | $(ZrO_2 + TiO_2 + Y_2O_3 + La_2O_3 + Gd_2O_3 + Nb_2O_5 + Ta_2O_5)/Al_2O_3$ | 0.09 | 0.11 | 0.09 | 0.11 |
|  | $ZrO_2 + TiO_2 + Y_2O_3 + La_2O_3 + Gd_2O_3 + Nb_2O_5 + Ta_2O_5$ | 1.00 | 2 | 1.00 | 2 |
| Characteristics | Specific gravity | 2.53 | | 2.54 | |
|  | Glass transition temp. [° C.] | 680 | | 673 | |
|  | Average linear expansion coefficient [$\times 10^{-7}$/° C.] (100 to 300° C.) | 70 | | 77 | |
|  | Young's modulus [GPa] | 83.0 | | 84.0 | |
|  | Specific modulus of elasticity [MN/kg] | 33 | | 33 | |
|  | Tav/Tmax | 0.81 | | 0.84 | |
| Fracture toughness value [MPa·$m^{1/2}$] (Unstrengthened product) | Load 9.81N (1000 gf) | 0.81 | | 0.8 | |
|  | Load 4.9N (500 gf) | 0.81 | | 0.8 | |
| Strengthening condition | Temp. [° C.] | 450 | | 450 | |
|  | Period [hr] | 4 | | 4 | |
|  | Salt melt | | | | |
|  | $KNO_3$ [%] | 60 | | 60 | |
|  | $NaNO_3$ [%] | 40 | | 40 | |
| Fracture toughness value [MPa·$m^{1/2}$] (strengthened product) | Load 9.81N (1000 gf) | 1.8 | | 1.78 | |
|  | Load 4.9N (500 gf) | 2.15 | | 2.11 | |
|  | $K_{1c}$(after)/$K_{1c}$(before) | 2.22 | | 2.23 | |

TABLE 3

|  |  | No. 3 | | No. 4 | | No. 5 | |
| --- | --- | --- | --- | --- | --- | --- | --- |
|  |  | mol % | mass % | mol % | mass % | mol % | mass % |
| Glass composition | $SiO_2$ | 65 | 64.7 | 65 | 63.55 | 67 | 67 |
|  | $Al_2O_3$ | 6 | 10.13 | 6 | 9.96 | 4 | 6.79 |
|  | $Li_2O$ | 1 | 0.5 | 1 | 0.49 | 1 | 0.5 |
|  | $Na_2O$ | 9 | 9.24 | 8 | 8.07 | 7 | 7.22 |
|  | $K_2O$ | 0 | 0 | 0 | 0 | 0 | 0 |
|  | MgO | 17 | 11.35 | 14 | 9.18 | 17 | 11.4 |
|  | CaO | 0 | 0 | 3 | 2.74 | 1 | 0.93 |
|  | SrO | 0 | 0 | 0 | 0 | 0 | 0 |
|  | BaO | 0 | 0 | 0 | 0 | 0 | 0 |
|  | $ZrO_2$ | 2 | 4.08 | 3 | 6.02 | 3 | 6.15 |
|  | Total | 100 | 100 | 100 | 100 | 100 | 100 |

TABLE 3-continued

|  |  |  |  |  |  |  |  |
|---|---|---|---|---|---|---|---|
|  | MgO + CaO + SrO + BaO | 17 | 11.35 | 17 | 11.92 | 18 | 12.33 |
|  | CaO/(MgO + CaO + SrO + BaO) | 0.000 | 0.000 | 0.176 | 0.230 | 0.056 | 0.075 |
|  | MgO/(MgO + CaO + SrO + BaO) | 1.000 | 1.000 | 0.824 | 0.770 | 0.944 | 0.925 |
|  | $Li_2O/Na_2O$ | 0.111 | 0.054 | 0.125 | 0.061 | 0.143 | 0.069 |
|  | $Li_2O/(Li_2O + Na_2O + K_2O)$ | 0.100 | 0.051 | 0.111 | 0.057 | 0.125 | 0.065 |
|  | $Li_2O + Na_2O + K2O$ | 10 | 9.74 | 9 | 8.56 | 8 | 7.72 |
|  | MgO + CaO + SrO | 17 | 11.35 | 17 | 11.92 | 18 | 12.33 |
|  | MgO + CaO | 17 | 11.35 | 17 | 11.92 | 18 | 12.33 |
|  | (MgO + CaO)/MgO + CaO + SrO) | 1.000 | 1.000 | 1.000 | 1.000 | 1.000 | 1.000 |
|  | $K_2O/(Li_2O + Na_2O + K_2O)$ | 0.000 | 0.000 | 0.000 | 0.000 | 0.000 | 0.000 |
|  | $Li_2O + Na_2O + K_2O + MgO + CaO + SrO$ | 27 | 21.09 | 26 | 20.48 | 26 | 20.05 |
|  | $(MgO + CaO + Li_2O)/(Li_2O + Na_2O + K_2O + MgO + CaO + SrO)$ | 0.667 | 0.562 | 0.692 | 0.606 | 0.731 | 0.640 |
|  | $(ZrO_2 + TiO_2 + Y_2O_3 + La_2O_3 + Gd_2O_3 + Nb_2O_5 + Ta_2O_5)/Al_2O_3$ | 0.333 | 0.403 | 0.500 | 0.604 | 0.750 | 0.906 |
|  | $ZrO_2 + TiO_2 + Y_2O_3 + La_2O_3 + Gd_2O_3 + Nb_2O_5 + Ta_2O_5$ | 2 | 4.08 | 3 | 6.02 | 3 | 6.15 |
| Characteristics | Specific gravity | 2.54 | | 2.58 | | 2.57 | |
|  | Glass transition temp.[° C.] | 671 | | 672 | | 680 | |
|  | Average linear expansion coefficient [×$10^{-7}$/° C.] (100 to 300° C.) | 66 | | 66 | | 61 | |
|  | Average linear expansion coefficient [×$10^{-7}$/° C.] (500 to 600° C.) | 77 | | 77 | | 71 | |
|  | Young's modulus[GPa] | 84.0 | | 85.9 | | 86.2 | |
|  | Specific modulus of elasticity [MN/kg] | 33 | | 33 | | 33.5 | |
|  | Fracture toughness value [MPa·$m^{1/2}$] Strengthening temp. = 400° C. Strengthening period = 4 hours Potassium nitrate:sodium nitrate = 60%:40% | 1.55 | | 1.4 | | 1.45 | |
|  | Strengthening temp. = 450° C. Strengthening period = 4 hours Potassium nitrate:sodium nitrate = 60%:40% | 1.75 | | 1.5 | | 1.6 | |
|  | Strengthening temp. = 500° C. Strengthening period = 4 hours Potassium nitrate:sodium nitrate = 60%:40% | 1.8 | | 1.55 | | 1.65 | |
|  | Strengthening temp. = 550° C. Strengthening period = 4 hours Potassium nitrate:sodium nitrate = 60%:40% | 2.1 | | 1.8 | | 1.7 | |
|  | Strengthening temp. = 600° C. Strengthening period = 4 hours Potassium nitrate:sodium nitrate = 60%:40% |  |  |  |  |  |  |
|  | Tav/Tmax Strengthening temp = 400° C. Strengthening period = 4 hours Potassium nitrate:sodium nitrate = 60%:40% | 0.83 | | 0.84 | | 0.84 | |

|  |  | No. 6 | | No. 7 | |
|---|---|---|---|---|---|
|  |  | mol % | mass % | mol % | mass % |
| Glass composition | $SiO_2$ | 65.5 | 64.42 | 61 | 59.8 |
|  | $Al_2O_3$ | 5 | 8.34 | 11 | 18.3 |
|  | $Li_2O$ | 1 | 0.49 | 1 | 0.49 |
|  | $Na_2O$ | 9 | 9.13 | 6.5 | 6.57 |
|  | $K_2O$ | 0 | 0 | 0 | 0 |
|  | MgO | 16 | 10.56 | 19.5 | 12.82 |
|  | CaO | 0 | 0 | 0 | 0 |
|  | SrO | 0 | 0 | 0 | 0 |
|  | BaO | 0 | 0 | 0 | 0 |
|  | $ZrO_2$ | 3.5 | 7.06 | 1 | 2.01 |
|  | Total | 100 | 100 | 100 | 100 |
|  | MgO + CaO + SrO + BaO | 16 | 10.56 | 19.5 | 12.82 |
|  | CaO/(MgO + CaO + SrO + BaO) | 0.000 | 0.000 | 0.000 | 0.000 |
|  | MgO/(MgO + CaO + SrO + BaO) | 1.000 | 1.000 | 1.000 | 1.000 |
|  | $Li_2O/Na_2O$ | 0.111 | 0.054 | 0.154 | 0.075 |
|  | $Li_2O/(Li_2O + Na_2O + K_2O)$ | 0.100 | 0.051 | 0.133 | 0.069 |
|  | $Li_2O + Na_2O + K2O$ | 10 | 9.62 | 7.5 | 7.06 |
|  | MgO + CaO + SrO | 16 | 10.56 | 19.5 | 12.82 |
|  | MgO + CaO | 16 | 10.56 | 19.5 | 12.82 |
|  | (MgO + CaO)/(MgO + CaO + SrO) | 1.000 | 1.000 | 1.000 | 1.000 |
|  | $K_2O/(Li_2O + Na_2O + K_2O)$ | 0.000 | 0.000 | 0.000 | 0.000 |
|  | $Li_2O + Na_2O + K_2O + MgO + CaO + SrO$ | 26 | 20.18 | 27 | 19.88 |
|  | $(MgO + CaO + Li_2O)/(Li_2O + Na_2O + K_2O + MgO + CaO + SrO)$ | 0.654 | 0.548 | 0.759 | 0.670 |
|  | $(ZrO_2 + TiO_2 + Y_2O_3 + La_2O_3 + Gd_2O_3 + Nb_2O_5 + Ta_2O_5)/Al_2O_3$ | 0.700 | 0.847 | 0.091 | 0.110 |
|  | $ZrO_2 + TiO_2 + Y_2O_3 + La_2O_3 + Gd_2O_3 + Nb_2O_5 + Ta_2O_5$ | 3.5 | 7.06 | 1 | 2.01 |
| Characteristics | Specific gravity | 2.58 | | 2.56 | |
|  | Glass transition temp.[° C.] | 680 | | 706 | |
|  | Average linear expansion coefficient [×$10^{-7}$/° C.] (100 to 300° C.) | 66 | | 58 | |

TABLE 3-continued

|  |  | | |
|---|---|---|---|
| Average linear expansion coefficient [×10$^{-7}$/° C.] (500 to 600° C.) | | 77 | 68 |
| Young's modulus [GPa] | | 85.3 | 89.2 |
| Specific modulus of elasticity [MN/kg] | | 33 | 36 |
| Fracture toughness value [MPa·m$^{1/2}$] | Strengthening temp. = 400° C. Strengthening period = 4 hours Potassium nitrate:sodium nitrate = 60%:40% | 1.5 | 1.7 |
| | Strengthening temp. = 450° C. Strengthening period = 4 hours Potassium nitrate:sodium nitrate = 60%:40% | 1.65 | 1.8 |
| | Strengthening temp. = 500° C. Strengthening period = 4 hours Potassium nitrate:sodium nitrate = 60%:40% | 1.7 | 2 |
| | Strengthening temp. = 550° C. Strengthening period = 4 hours Potassium nitrate:sodium nitrate = 60%:40% | 1.75 | 1.95 |
| | Strengthening temp. = 600° C. Strengthening period = 4 hours Potassium nitrate:sodium nitrate = 60%:40% | | 1.95 |
| Tav/Tmax Strengthening temp = 400° C. Strengthening period = 4 hours Potassium nitrate:sodium nitrate = 60%:40% | | 0.83 | 0.85 |

|  |  | No. 8 | | No. 9 | |
|---|---|---|---|---|---|
|  |  | mol % | mass % | mol % | mass % |
| Glass composition | SiO$_2$ | 61 | 58.97 | 63 | 62.1 |
| | Al$_2$O$_3$ | 11 | 18.05 | 10 | 16.73 |
| | Li$_2$O | 1 | 0.48 | 1 | 0.49 |
| | Na$_2$O | 10.5 | 10.47 | 6 | 6.1 |
| | K$_2$O | 0 | 0 | 0 | 0 |
| | MgO | 15.5 | 10.05 | 19 | 12.56 |
| | CaO | 0 | 0 | 0 | 0 |
| | SrO | 0 | 0 | 0 | 0 |
| | BaO | 0 | 0 | 0 | 0 |
| | ZrO$_2$ | 1 | 1.98 | 1 | 2.02 |
| | Total | 100 | 100 | 100 | 100 |
| | MgO + CaO + SrO + BaO | 15.5 | 10.05 | 19 | 12.56 |
| | CaO/(MgO + CaO + SrO + BaO) | 0.000 | 0.000 | 0.000 | 0.000 |
| | MgO/(MgO + CaO + SrO + BaO) | 1.000 | 1.000 | 1.000 | 1.000 |
| | Li$_2$O/Na$_2$O | 0.095 | 0.046 | 0.167 | 0.080 |
| | Li$_2$O/(Li$_2$O + Na$_2$O + K$_2$O) | 0.087 | 0.044 | 0.143 | 0.074 |
| | Li$_2$O + Na$_2$O + K2O | 11.5 | 10.95 | 7 | 6.59 |
| | MgO + CaO + SrO | 15.5 | 10.05 | 19 | 12.56 |
| | MgO + CaO | 15.5 | 10.05 | 19 | 12.56 |
| | (MgO + CaO)/(MgO + CaO + SrO) | 1.000 | 1.000 | 1.000 | 1.000 |
| | K$_2$O/(Li$_2$O + Na$_2$O + K$_2$O) | 0.000 | 0.000 | 0.000 | 0.000 |
| | Li$_2$O + Na$_2$O + K$_2$O + MgO + CaO + SrO | 27 | 21 | 26 | 19.15 |
| | (MgO + CaO + Li$_2$O)/(Li$_2$O + Na$_2$O + K$_2$O + MgO + CaO + SrO) | 0.611 | 0.501 | 0.769 | 0.681 |
| | (ZrO$_2$ + TiO$_2$ + Y$_2$O$_3$ + La$_2$O$_3$ + Gd$_2$O$_3$ + Nb$_2$O$_5$ + Ta$_2$O$_5$)/Al$_2$O$_3$ | 0.091 | 0.110 | 0.100 | 0.121 |
| | ZrO$_2$ + TiO$_2$ + Y$_2$O$_3$ + La$_2$O$_3$ + Gd$_2$O$_3$ + Nb$_2$O$_5$ + Ta$_2$O$_5$ | 1 | 1.98 | 1 | 2.02 |
| Characteristics | Specific gravity | 2.53 | | 2.54 | |
| | Glass transition temp. [° C.] | 678 | | 703 | |
| | Average linear expansion coefficient [×10$^{-7}$/° C.] (100 to 300° C.) | 70 | | 56 | |
| | Average linear expansion coefficient [×10$^{-7}$/° C.] (500 to 600° C.) | 82 | | 65 | |
| | Young's modulus [GPa] | 83.4 | | 88.4 | |
| | Specific modulus of elasticity [MN/kg] | 33.9 | | 35.7 | |
| | Fracture toughness value [MPa·m$^{1/2}$] Strengthening temp = 400° C. Strengthening period = 4 hours Potassium nitrate:sodium nitrate = 60%:40% | 1.6 | | 1.55 | |
| | Strengthening temp = 450° C. Strengthening period = 4 hours Potassium nitrate:sodium nitrate = 60%:40% | 1.8 | | 1.75 | |
| | Strengthening temp. = 500° C. Strengthening period = 4 hours Potassium nitrate:sodium nitrate = 60%:40% | 2.1 | | 2 | |
| | Strengthening temp. = 550° C. Strengthening period = 4 hours Potassium nitrate:sodium nitrate = 60%:40% | 2.55 | | 2.55 | |
| | Strengthening temp. = 600° C. Strengthening period = 4 hours Potassium nitrate:sodium nitrate = 60%:40% | 2.6 | | 2.5 | |

TABLE 3-continued

|  |  |  |
|---|---|---|
| Tav/Tmax | 0.81 | 0.8 |
| Strengthening temp = 400° C. Strengthening period = 4 hours | | |
| Potassium nitrate:sodium nitrate = 60%:40% | | |

TABLE 4

|  |  | No. 10 | | No. 11 | | No. 12 | |
|---|---|---|---|---|---|---|---|
|  |  | mol % | mass % | mol % | mass % | mol % | mass % |
| Glass composition | $SiO_2$ | 62.76 | 62.57 | 66 | 65.55 | 65.5 | 64.48 |
|  | $Al_2O_3$ | 10.5 | 17.76 | 5 | 8.43 | 5 | 8.35 |
|  | $Li_2O$ | 2 | 0.99 | 1 | 0.49 | 1 | 0.49 |
|  | $Na_2O$ | 5 | 5.14 | 7 | 7.17 | 8 | 8.12 |
|  | $K_2O$ | 0 | 0 | 0 | 0 | 0 | 0 |
|  | MgO | 19.5 | 13.04 | 17 | 11.33 | 16 | 10.57 |
|  | CaO | 0 | 0 | 1 | 0.93 | 1 | 0.92 |
|  | SrO | 0 | 0 | 0 | 0 | 0 | 0 |
|  | BaO | 0 | 0 | 0 | 0 | 0 | 0 |
|  | $ZrO_2$ | 0.24 | 0.49 | 3 | 6.11 | 3.5 | 7.07 |
|  | Total | 100 | 100 | 100 | 100 | 100 | 100 |
|  | MgO + CaO + SrO + BaO | 19.500 | 13.040 | 18.000 | 12.260 | 17.000 | 11.490 |
|  | CaO/(MgO + CaO + SrO + BaO) | 0.000 | 0.000 | 0.056 | 0.076 | 0.059 | 0.080 |
|  | MgO/(MgO + CaO + SrO + BaO) | 1.000 | 1.000 | 0.944 | 0.924 | 0.941 | 0.920 |
|  | $Li_2O/Na_2O$ | 0.400 | 0.193 | 0.143 | 0.068 | 0.125 | 0.060 |
|  | $Li_2O/(Li_2O + Na_2O + K_2O)$ | 0.286 | 0.162 | 0.125 | 0.064 | 0.111 | 0.057 |
|  | $Li_2O + Na_2O + K2O$ | 7 | 6.13 | 8 | 7.66 | 9 | 8.61 |
|  | MgO + CaO + SrO | 19.5 | 13.04 | 18 | 12.26 | 17 | 11.49 |
|  | MgO + CaO | 19.5 | 13.04 | 18 | 12.26 | 17 | 11.49 |
|  | (MgO + CaO)/(MgO + CaO + SrO) | 1.000 | 1.000 | 1.000 | 1.000 | 1.000 | 1.000 |
|  | $K_2O/(Li_2O + Na_2O + K_2O)$ | 0.000 | 0.000 | 0.000 | 0.000 | 0.000 | 0.000 |
|  | $Li_2O + Na_2O + K_2O + MgO + CaO + SrO$ | 26.5 | 19.17 | 26 | 19.92 | 26 | 20.1 |
|  | $(MgO + CaO + Li_2O)/(Li_2O + Na_2O + K_2O + MgO + CaO + SrO)$ | 0.811 | 0.732 | 0.731 | 0.640 | 0.692 | 0.596 |
|  | $(ZrO_2 + TiO_2 + Y_2O_3 + La_2O_3 + Gd_2O_3 + Nb_2O_5 + Ta_2O_5)/Al_2O_3$ | 0.023 | 0.028 | 0.600 | 0.725 | 0.700 | 0.847 |
|  | $ZrO_2 + TiO_2 + Y_2O_3 + La_2O_3 + Gd_2O_3 + Nb_2O_5 + Ta_2O_5$ | 0.24 | 0.49 | 3 | 6.11 | 3.5 | 7.07 |
| Characteristics | Fracture toughness value [MPa·m$^{1/2}$] | 1.33 | | 1.68 | | 1.39 | |
|  | Chemical strengthening temp. [° C.] | 450 | | 500 | | 450 | |
|  | Chemical strengthening period [hr] | 4 | | 6 | | 2 | |
|  | Potassium nitrate:sodium nitrate | 60%:40% | | 90%:10% | | 80%:20% | |
|  | Tav/Tmax | 0.89 | | 0.85 | | 0.84 | |
|  | Specific gravity | 2.55 | | 2.58 | | 2.59 | |
|  | Glass transition temp. [° C.] | 692.9 | | 681 | | 681 | |
|  | Average linear expansion coefficient [×10$^{-7}$/° C.] (100 to 300° C.) | 54 | | 63 | | 65 | |
|  | Average linear expansion coefficient [×10$^{-7}$/° C.] (500 to 600° C.) | 63 | | 73 | | 76 | |
|  | Young's modulus [GPa] | 85.2 | | 86.5 | | 86.3 | |
|  | Specific modulus of elasticity [MN/kg] | 33.4 | | 33.5 | | 33.3 | |

TABLE 5

|  |  | No. 13 | | No. 14 | |
|---|---|---|---|---|---|
|  |  | mol % | mass % | mol % | mass % |
| Glass composition | $SiO_2$ | 65 | 64.62 | 63 | 61.78 |
|  | $Al_2O_3$ | 6 | 10.12 | 10 | 16.64 |
|  | $Li_2O$ | 1 | 0.49 | 1 | 0.49 |
|  | $Na_2O$ | 9 | 9.23 | 6 | 6.07 |
|  | $K_2O$ | 0 | 0 | 0 | 0 |
|  | MgO | 16.5 | 11 | 17 | 11.18 |
|  | CaO | 0.5 | 0.46 | 2 | 1.83 |
|  | SrO | 0 | 0 | 0 | 0 |
|  | BaO | 0 | 0 | 0 | 0 |
|  | $ZrO_2$ | 2 | 4.08 | 1 | 2.01 |
|  | Total | 100.00 | 100.00 | 100.00 | 100.00 |
|  | MgO + CaO + SrO + BaO | 17.000 | 11.460 | 19.000 | 13.010 |
|  | CaO/(MgO + CaO + SrO + BaO) | 0.029 | 0.040 | 0.105 | 0.141 |
|  | MgO/(MgO + CaO + SrO + BaO) | 0.971 | 0.960 | 0.895 | 0.859 |
|  | $Li_2O/Na_2O$ | 0.111 | 0.053 | 0.167 | 0.081 |
|  | $Li_2O/(Li_2O + Na_2O + K_2O)$ | 0.100 | 0.050 | 0.143 | 0.075 |

TABLE 5-continued

|  |  |  |  |  |  |
|---|---|---|---|---|---|
|  | Li₂O + Na₂O + K2O | 10 | 9.72 | 7 | 6.56 |
|  | MgO + CaO + SrO | 17 | 11.46 | 19 | 13.01 |
|  | MgO + CaO | 17 | 11.46 | 19 | 13.01 |
|  | (MgO + CaO)/(MgO + CaO + SrO) | 1.000 | 1.000 | 1.000 | 1.000 |
|  | K₂O/(Li₂O + Na₂O + K₂O) | 0.000 | 0.000 | 0.000 | 0.000 |
| Characteristics | Specific gravity | 2.55 | | 2.56 | |
|  | Glass transition temp. [° C.] | 669 | | 700 | |
|  | Average linear expansion coefficient [×10⁻⁷/° C.] (100 to 300° C.) | 67 | | 56 | |
|  | Average linear expansion coefficient [×10⁻⁷/° C.] (500 to 600° C.) | 78 | | 65 | |
|  | Young's modulus [GPa] | 83.9 | | 86.4 | |
|  | Specific modulus of elasticity [MN/kg] | 32.9 | | 33.8 | |
| Fracture toughness value [MPa·m^(1/2)] | Strengthening temp. = 400° C. Strengthening period = 4 hours Potassium nitrate:sodium nitrate = 60%:40% | 1.5 | | 1.45 | |
|  | Strengthening temp. = 450° C. Strengthening period = 4 hours Potassium nitrate:sodium nitrate = 60%:40% | 1.65 | | 1.55 | |
|  | Strengthening temp. = 500° C. Strengthening period = 4 hours Potassium nitrate:sodium nitrate = 60%:40% | 1.7 | | 1.6 | |
|  | Tav/Tmax Strengthening temp. = 400° C. Strengthening period = 4 hours Potassium nitrate:sodium nitrate = 60%:40% | 0.8 | | 0.81 | |

|  |  | No. 15 | | No. 16 | |
|---|---|---|---|---|---|
|  |  | mol % | mass % | mol % | mass % |
| Glass composition | SiO₂ | 65.12 | 64.69 | 64.94 | 64.56 |
|  | Al₂O₃ | 6.01 | 10.13 | 5.99 | 10.12 |
|  | Li₂O | 0.6 | 0.3 | 0.6 | 0.3 |
|  | Na₂O | 9.24 | 9.46 | 8.39 | 8.61 |
|  | K₂O | 0 | 0 | 0 | 0 |
|  | MgO | 17.03 | 11.34 | 16.98 | 11.32 |
|  | CaO | 0 | 0 | 1.1 | 1.02 |
|  | SrO | 0 | 0 | 0 | 0 |
|  | BaO | 0 | 0 | 0 | 0 |
|  | ZrO₂ | 2 | 4.08 | 2 | 4.07 |
|  | Total | 100.00 | 100.00 | 100.00 | 100.00 |
|  | MgO + CaO + SrO + BaO | 17.030 | 11.340 | 18.080 | 12.340 |
|  | CaO/(MgO + CaO + SrO + BaO) | 0.000 | 0.000 | 0.061 | 0.083 |
|  | MgO/(MgO + CaO + SrO + BaO) | 1.000 | 1.000 | 0.939 | 0.917 |
|  | Li₂O/Na₂O | 0.065 | 0.032 | 0.072 | 0.035 |
|  | Li₂O/(Li₂O + Na₂O + K₂O) | 0.061 | 0.031 | 0.067 | 0.034 |
|  | Li₂O + Na₂O + K2O | 9.84 | 9.76 | 8.99 | 8.91 |
|  | MgO + CaO + SrO | 17.03 | 11.34 | 18.08 | 12.34 |
|  | MgO + CaO | 17.03 | 11.34 | 18.08 | 12.34 |
|  | (MgO + CaO)/(MgO + CaO + SrO) | 1.000 | 1.000 | 1.000 | 1.000 |
|  | K₂O/(Li₂O + Na₂O + K₂O) | 0.000 | 0.000 | 0.000 | 0.000 |
| Characteristics | Specific gravity | 2.544 | | 2.553 | |
|  | Glass transition temp. [° C.] | 679 | | 679 | |
|  | Average linear expansion coefficient [×10⁻⁷/° C.] (100 to 300° C.) | 67 | | 66 | |
|  | Average linear expansion coefficient [×10⁻⁷/° C.] (500 to 600° C.) | 77 | | 76 | |
|  | Young's modulus [GPa] | 84.1 | | 84.9 | |
|  | Specific modulus of elasticity [MN/kg] | 33.1 | | 33.3 | |
| Fracture toughness value [MPa·m^(1/2)] | Strengthening temp. = 400° C. Strengthening period = 4 hours Potassium nitrate:sodium nitrate = 60%:40% | 1.33 | | 1.24 | |
|  | Strengthening temp. = 450° C. Strengthening period = 4 hours Potassium nitrate:sodium nitrate = 60%:40% | 1.6 | | 1.35 | |
|  | Strengthening temp. = 500° C. Strengthening period = 4 hours Potassium nitrate:sodium nitrate = 60%:40% | 1.74 | | 1.58 | |
|  | Tav/Tmax Strengthening temp. = 400° C. Strengthening period = 4 hours Potassium nitrate:sodium nitrate = 60%:40% | 0.76 | | 0.77 | |

|  |  | No. 17 | | No. 18 | |
|---|---|---|---|---|---|
|  |  | mol % | mass % | mol % | mass % |
| Glass composition | SiO₂ | 64.61 | 64.19 | 64.02 | 63.59 |
|  | Al₂O₃ | 5.96 | 10.06 | 5.91 | 9.96 |
|  | Li₂O | 0.4 | 0.2 | 0.2 | 0.1 |

TABLE 5-continued

|  |  |  |  |  |
|---|---:|---:|---:|---:|
| Na$_2$O | 8.55 | 8.76 | 8.67 | 8.88 |
| K$_2$O | 0 | 0 | 0 | 0 |
| MgO | 16.9 | 11.26 | 16.74 | 11.15 |
| CaO | 1.59 | 1.48 | 2.49 | 2.31 |
| SrO | 0 | 0 | 0 | 0 |
| BaO | 0 | 0 | 0 | 0 |
| ZrO$_2$ | 1.99 | 4.05 | 1.97 | 4.01 |
| Total | 100.00 | 100.00 | 100.00 | 100.00 |
| MgO + CaO + SrO + BaO | 18.490 | 12.740 | 19.230 | 13.460 |
| CaO/(MgO + CaO + SrO + BaO) | 0.086 | 0.116 | 0.129 | 0.172 |
| MgO/(MgO + CaO + SrO + BaO) | 0.914 | 0.884 | 0.871 | 0.828 |
| Li$_2$O/Na$_2$O | 0.047 | 0.023 | 0.023 | 0.011 |
| Li$_2$O/(Li$_2$O + Na$_2$O + K$_2$O) | 0.045 | 0.022 | 0.023 | 0.011 |
| Li$_2$O + Na$_2$O + K2O | 8.95 | 8.96 | 8.87 | 8.98 |
| MgO + CaO + SrO | 18.49 | 12.74 | 19.23 | 13.46 |
| MgO + CaO | 18.49 | 12.74 | 19.23 | 13.46 |
| (MgO + CaO)/(MgO + CaO + SrO) | 1.000 | 1.000 | 1.000 | 1.000 |
| K$_2$O/(Li$_2$O + Na$_2$O + K$_2$O) | 0.000 | 0.000 | 0.000 | 0.000 |
| Characteristics Specific gravity | | 2.562 | | 2.569 |
| Glass transition temp. [° C.] | | 681 | | 681 |
| Average linear expansion coefficient [×10$^{-7}$/° C.] (100 to 300° C.) | | 67 | | 68 |
| Average linear expansion coefficient [×10$^{-7}$/° C.] (500 to 600° C.) | | 78 | | 79 |
| Young's modulus [GPa] | | 85.1 | | 85.8 |
| Specific modulus of elasticity [MN/kg] | | 33.2 | | 33.4 |
| Fracture toughness value [MPa · m$^{1/2}$] Strengthening temp. = 400° C. Strengthening period = 4 hours Potassium nitrate:sodium nitrate = 60%:40% | | 1.1 | | 1.1 |
| Strengthening temp. = 450° C. Strengthening period = 4 hours Potassium nitrate:sodium nitrate = 60%:40% | | 1.28 | | 1.28 |
| Strengthening temp. = 500° C. Strengthening period = 4 hours Potassium nitrate:sodium nitrate = 60%:40% | | 1.41 | | 1.41 |
| Tav/Tmax Strengthening temp. = 400° C. Strengthening period = 4 hours Potassium nitrate:sodium nitrate = 60%:40% | | 0.65 | | 0.52 |

TABLE 6

|  |  | No. 19 | |
|---|---|---:|---:|
|  |  | mol % | mass % |
| Glass composition | SiO$_2$ | 65 | 63.59 |
|  | Al$_2$O$_3$ | 6 | 9.96 |
|  | Li$_2$O | 1 | 0.1 |
|  | Na$_2$O | 8 | 8.88 |
|  | K$_2$O | 0 | 0 |
|  | MgO | 12 | 11.15 |
|  | CaO | 5 | 2.31 |
|  | SrO | 0 | 0 |
|  | BaO | 0 | 0 |
|  | ZrO$_2$ | 3 | 4.01 |
|  | Total | 100.00 | 100.00 |
|  | MgO + CaO + SrO + BaO | 17.000 | 13.460 |
|  | CaO/(MgO + CaO + SrO + BaO) | 0.294 | 0.172 |
|  | MgO/(MgO + CaO + SrO + BaO) | 0.706 | 0.828 |
|  | Li$_2$O/Na$_2$O | 0.125 | 0.011 |
|  | Li$_2$O/(Li$_2$O + Na$_2$O + K$_2$O) | 0.111 | 0.011 |
|  | Li$_2$O + Na$_2$O + K2O | 9 | 8.98 |
|  | MgO + CaO + SrO | 17 | 13.46 |
|  | MgO + CaO | 17 | 13.46 |
|  | (MgO + CaO)/(MgO + CaO + SrO) | 1.000 | 1.000 |
|  | K$_2$O/(Li$_2$O + Na$_2$O + K$_2$O) | 0.000 | 0.000 |
| Characteristics | Specific gravity | 2.6 | |
|  | Glass transition temp. [° C.] | 670 | |
|  | Average linear expansion coefficient [×10$^{-7}$/° C.] (100 to 300° C.) | 67 | |
|  | Average linear expansion coefficient [×10$^{-7}$/° C.] (500 to 600° C.) | 79 | |
|  | Young's modulus [GPa] | 85.8 | |
|  | Specific modulus of elasticity [MN/kg] | 33.0 | |

As shown in Tables 2 to 5, the glass substrates of Nos. 1 to 18 possessed all four of the characteristics required of magnetic recording media substrates, namely: high heat resistance (a high glass transition temperature), high stiffness (a high Young's modulus), a high thermal expansion coefficient, and high fracture toughness. Based on the results shown in Tables 2 to 5, the glass substrates of Nos. 1 to 18 were found to have high specific moduli of elasticity capable of withstanding high-speed rotation and low specific gravities, permitting substrate weight reduction. Additionally, the glasses used in Examples to fabricate glass substrates readily permitted the formation of ion-exchange layers by chemical strengthening processing. As a result, they were found to exhibit high fracture toughness.

From the above results, it was determined that an aspect of the present invention can provide the glass having characteristics that are required for magnetic recording medium substrates.

Figure 5:
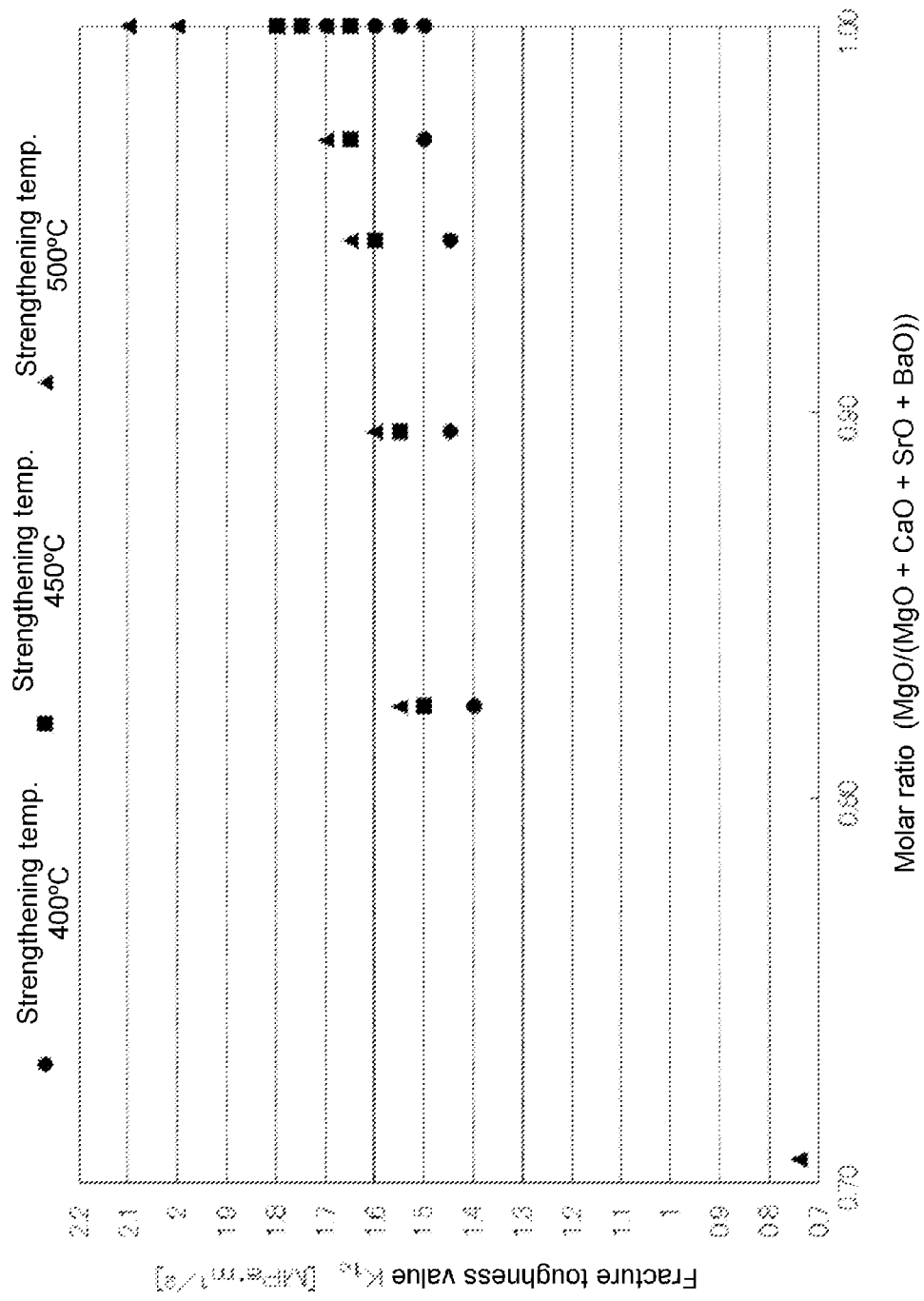
FIG. 5 is a graph showing the relation of the molar ratio (MaO/(MgO+CaO+SrO+BaO)) and the fracture toughness value of a chemically strengthened glass substrate.
Figure 6:
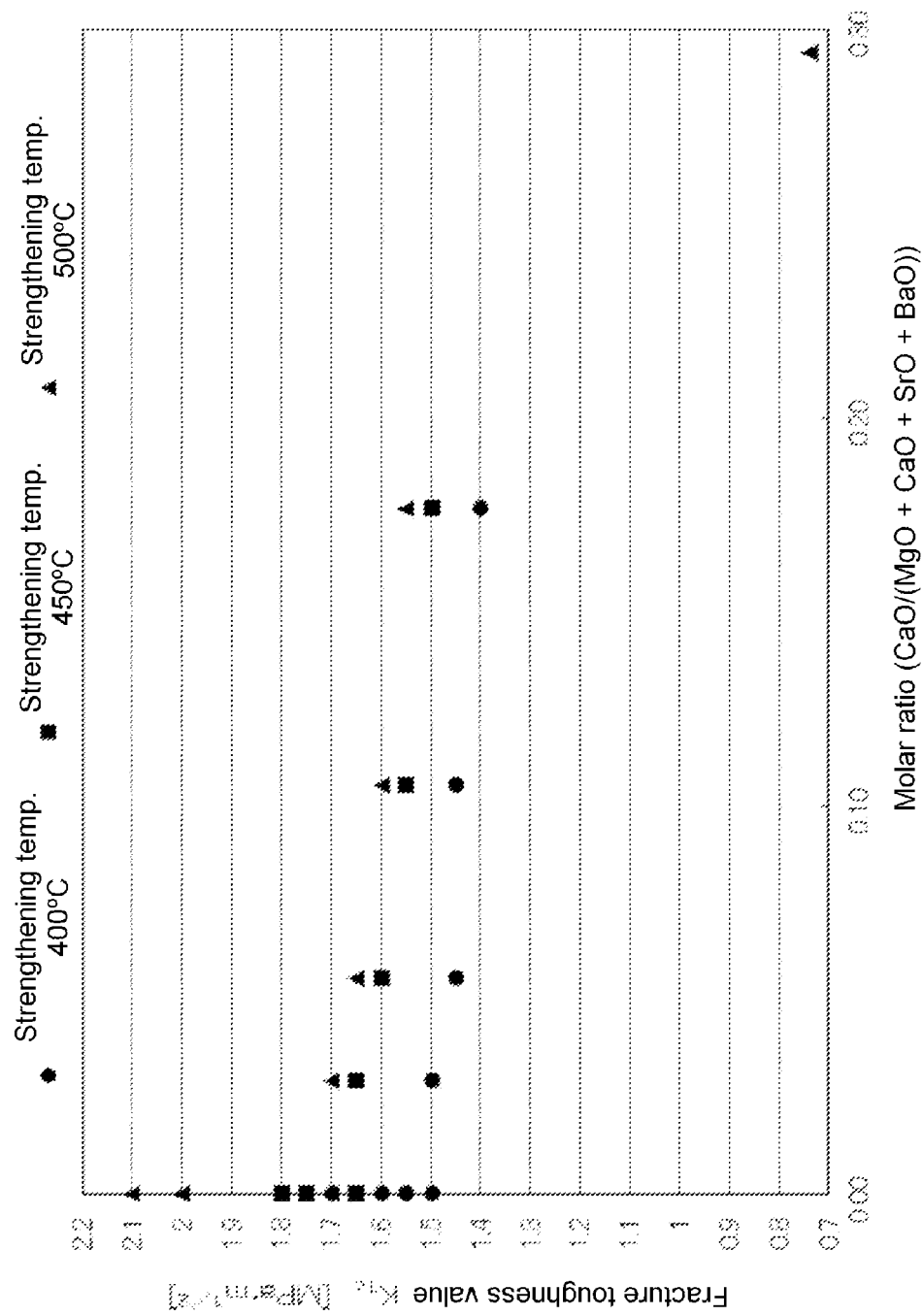
FIG. 6 is a graph showing the relation of the molar ratio (CaO/(MgO+CaO+SrO+BaO)) and the fracture toughness value of a chemically strengthened glass substrate.

FIG. 5 is a graph in which the fracture toughness value following chemical strengthening is plotted against the molar ratio (MgO/(MgO+CaO+SrO+BaO)) for glasses Nos. 3 to 9, 11, and 12 in Tables 3 and 4. FIG. 6 is a graph in which the fracture toughness value following chemical strengthening is plotted against the molar ratio (CaO/(MgO+CaO+SrO+BaO)) for glasses Nos. 3 to 9, 11, and 12 in Tables 3 and 4.

From these graphs, it was determined that as the molar ratio (MgO/(MgO+CaO+SrO+BaO)) increased or the molar ratio (CaO/(MgO+CaO+SrO+BaO)) decreased, the fracture toughness value—that is, the mechanical strength—increased.

When chemical strengthening was conducted at a salt melt temperature of 500° C. using glass (No. 19) which had a molar ratio (MgO/(MgO+CaO+SrO+BaO)) of 0.706 and a molar ratio (CaO/(MgO+CaO+SrO+BaO)) of 0.294 as indicated in Table 6, the fracture toughness value was 0.74 MPa·m$^{1/2}$. Further, when multiple sheets of glass were simultaneously immersed in 500° C. salt melt and chemically strengthened, the salt melt deteriorated abruptly and the fracture toughness value after strengthening did not reach 0.74 MPa·m$^{1/2}$. Similarly, even when multiple pieces of glass were sequentially immersed in 500° C. salt melt and chemically strengthened, the fracture toughness value of the chemically strengthened glass dropped sharply from the second time on. This was presumed to have occurred because, as set forth above, the Ca$^{2+}$ ions contained in the glass composition leached out into the salt melt, blocking the ion effect of the alkali metal ions. The same result was seen when the molar ratio (MgO/(MgO+CaO+SrO+BaO)) was smaller than 0.8 and the molar ratio (CaO/(MgO+CaO+SrO+BaO)) was greater than 0.2.

By contrast, even when multiple pieces of the various glasses of Nos. 1 to 18 indicated in Tables 2 to 5 were chemically strengthened by being simultaneously immersed in salt melt, it was possible to maintain a fracture toughness value of equal to or greater than 0.90 MPa·m$^{1/2}$. Even when multiple pieces of the various glasses of Nos. 1 to 18 were sequentially immersed in salt melt and chemically strengthened, it was possible to maintain a fracture toughness value of equal to or greater than 0.90 MPa·m$^{1/2}$.

Thus, glasses with a molar ratio (MgO/(MgO+CaO+SrO+BaO)) of equal to or greater than 0.80 and a molar ratio (CaO/(MgO+CaO+SrO+BaO)) of equal to or lower than 0.20 tended not to cause deterioration of the salt melt due to chemical strengthening, permitting the stable production of chemically strengthened glass having a high fracture toughness value. By contrast, at a molar ratio (MgO/(MgO+CaO+SrO+BaO)) of less than 0.80 and a molar ratio (CaO/(MgO+CaO+SrO+BaO)) exceeding 0.20, chemical strengthening caused deterioration of the salt melt and it was difficult to maintain a high fracture toughness value.

In glasses Nos. 1 to 9 following chemical strengthening, compressive stress layers 30 to 120 μm in depth were formed in the surface. The magnitude of the compressive stress was a value of equal to or higher than 2.0 kgf/mm$^2$ (a value of equal to or higher than 19.6 MPa). In glasses Nos. 10 to 18, compressive stress layers 20 to 120 μm in depth were formed in the surface. The magnitude of the compressive stress was a value of equal to or higher than 2.0 kgf/mm$^2$ (a value of equal to or higher than 19.6 MPa).

Based on these results, an aspect of the present invention was confirmed to provide glass having all of the characteristics required for a magnetic recording medium substrate.

Further, with the exception that mirror-surface polishing was conducted so as to remove a portion within a range suitably selected from 0.5 to 5 μm following ion-exchange processing, glass substrates were fabricated by the same method as above. Observation by the Babinet method of the cross sections of the multiple glass substrates obtained revealed the formation of ion-exchange layers and no deterioration of mechanical strength. Other characteristics were identical to those set forth above.

For the various Examples (the various glasses of Nos. 1 to 18 following chemical strengthening), in cross-sectional photographs obtained by observation by the Babinet method, the tensile stress distribution was convex in shape and there was no uphill in the stress profile in a virtual cross section perpendicular to the two main surfaces. When Tav/Tmax was calculated by the method set forth above that has been explained on the basis of FIG. 3 and based on these stress profiles, the Tav/Tmax value following chemical strengthening of glasses Nos. 1 to 15 was equal to or higher than 0.8. The Tav/Tmax values following chemical strengthening of glasses Nos. 16 to 18 was equal to or higher than 0.5.

The following tests were conducted to demonstrate that the above chemically strengthened glass substrates exhibiting the above stress profiles did not indicate delayed fractures.

Indentations made by pressing a Vickers indenter at an indentation load of 9.81 N were present in the samples following chemical strengthening processing for which the fracture toughness value had been measured in Examples. The samples with indentations were placed in an environment tester and left standing for 7 days in an environment of a temperature of 80° C. and a relative humidity of 80%. They were then removed and the indentations were observed. For each of Examples, 100 samples were prepared and the test was conducted. As a result, no crack extension was observed from the indentations in any of the samples.

By contrast, when glasses containing Na$_2$O and K$_2$O but not containing Li$_2$O—for example, glass composition No. 3, a glass composition in which the total quantity of Li$_2$O was replaced with Na$_2$O—were immersed in a potassium nitrate salt melt and chemically strengthened samples were prepared, uphills such as those shown in FIG. 2 were observed in the stress profile by the Babinet method and Tav/Tmax<0.5. When these samples were subjected to the above test, eight of the 100 sheets exhibited lengthening of cracks from the indentations. Three of the sheets exhibited marked crack extension and had fractures.

Based on the above acceleration testing for delayed fracturing, a delayed fracturing prevention effect was found to have been achieved in the chemically strengthened glass substrates of Examples.

3. Evaluation of Magnetic Disks (1) Flatness

Generally, a degree of flatness of equal to or lower than 5 μm permits highly reliable recording and reproduction. The degree of flatness (the distance (difference in height) in the vertical direction (direction perpendicular to the surface) of the highest portion and lowest portion of the disk surfaces) of the surfaces of the various magnetic disks formed using the glass substrates of Examples by the above-described methods was measured with a flatness measuring apparatus. All of the magnetic disks had degrees of flatness of equal to or lower than 5 μm. From these results, it can be determined that the glass substrates of Examples did not undergo substantial deformation even when processed at high temperature during the formation of an FePt layer or CoPt layer.

(2) Load/Unload Test

The various magnetic disks formed using the glass substrates of Examples by the above methods were loaded into a 2.5-inch hard disk drive that rotated at a high speed of 10,000 rpm and subjected to a load/unload test ("LUL" hereinafter). The spindle of the spindle motor in the above hard disk drive was made of stainless steel. The durability of all of the magnetic disks exceeded 600,000 cycles. Further, although crash failures and thermal asperity failures will occur during LUL testing with deformation due to a difference in the coefficient of thermal expansion with the spindle material and deflection due to high-speed rotation, such failures did not occur during testing of any of the magnetic disks.

(3) Impact Resistance Testing

Glass substrates for magnetic disks (2.5 inches, sheet thickness 0.8 mm) were prepared. A Model-15D made by Lansmont was employed to conduct impact testing. In the impact testing, the magnetic disk glass substrate was assembled into a dedicated impact testing jig prepared with a spindle and clamp members similar to those of a HDD, an impact in the form of a half sine wave pulse of 1,500 G was applied perpendicularly for 1 msec to the main surface, and the damage to the magnetic disk glass substrate was observed.

As a result, no damage was observed in the glass substrates of Examples. On the other hand, damage was observed in the glass substrate of Comparative Example. Detailed analysis was conducted on a portion at which the damage occurred, revealing that the damage mainly occurred in an inner diameter portion.

Based on the above results, the present invention was confirmed to yield a glass substrate for a magnetic recording medium that afforded excellent impact resistance and permitted recording and reproduction with high reliability.

A glass disk prepared by the above method using the glass substrate of Examples was loaded into the hard disk drive of a recording mode in which magnetization reversal was assisted by irradiating the magnetic disk with a laser beam (heat-assisted recording method) and a magnetic recording medium of the heat-assisted recording type was prepared. The magnetic recording apparatus contained a heat-assisted magnetic recording head with a heat source (laser beam source) heating the main surface of a magnetic recording medium (magnetic disk), a recording element and a reproduction element, and a magnetic disk. The magnetic head of the magnetic recording apparatus was a DFH (dynamic flying height) head and the rotational speed of the magnetic disk was 10,000 rpm.

A separately prepared magnetic disk was loaded into a hard disk drive employing a recording mode assisted by microwaves (microwave-assisted recording mode) and a microwave-assisted recording mode information recording apparatus was prepared. Such information recording apparatuses, combining a high Ku magnetic material and energy-assisted recording, permitted high-density recording in the manner set forth above.

An aspect of the present invention can provide an optimal magnetic recording medium for high-density recording.

The implementation modes that have been given by way of example above are examples in all respects and are not to be construed as limitations. The scope of the present invention is given by the claims, not by the above descriptions. All modifications of equivalent meaning and falling within the scope of the claims are intended to be covered.

What is claimed is:

1. Glass for a magnetic recording medium substrate, which comprises:
    essential components in the form of $SiO_2$, $Li_2O$, $Na_2O$, and one or more alkaline earth metal oxides selected from the group consisting of MgO, CaO, SrO, and BaO;
    wherein a molar ratio of a content of MgO to a combined content of MgO, CaO, SrO, and BaO (MgO/(MgO+CaO+SrO+BaO)) is equal to or greater than 0.80; and which has a glass transition temperature of equal to or greater than 620° C., and
    wherein a specific modulus of elasticity is equal to or greater than 30 MNm/kg.

2. Glass for a magnetic recording medium substrate, which comprises:
    essential components in the form of $SiO_2$, $Li_2O$, $Na_2O$, and one or more alkaline earth metal oxides selected from the group consisting of MgO, CaO, SrO, and BaO;
    wherein a molar ratio of a content of CaO to a combined content of MgO, CaO, SrO, and BaO (CaO/(MgO+CaO+SrO+BaO)) is equal to or less than 0.20; and which has a glass transition temperature of equal to or greater than 620° C., and
    wherein a specific modulus of elasticity is equal to or greater than 30 MNm/kg.

3. The glass for a magnetic recording medium substrate according to claim 1, which has a Young's modulus of equal to or greater than 80 GPa.

4. The glass for a magnetic recording medium substrate according to claim 2, which has a Young's modulus of equal to or greater than 80 GPa.

5. A magnetic recording medium substrate blank, which is comprised of the glass for a magnetic recording medium substrate according to claim 1.

6. A magnetic recording medium substrate blank, which is comprised of the glass for a magnetic recording medium substrate according to claim 2.

7. A magnetic recording medium substrate, which is comprised of the glass for a magnetic recording medium substrate according to claim 1.

8. A magnetic recording medium substrate, which is comprised of the glass for a magnetic recording medium substrate according to claim 2.

9. A magnetic recording medium substrate, which is comprised of chemically strengthened glass that has been prepared by chemically strengthening the glass for a magnetic recording medium substrate according to claim 1.

10. A magnetic recording medium substrate, which is comprised of chemically strengthened glass that has been prepared by chemically strengthening the glass for a magnetic recording medium substrate according to claim 2.

11. The magnetic recording medium substrate according to claim 1, which is comprised of glass having a fracture toughness value of equal to or greater than 0.9 $MPa \cdot m^{1/2}$.

12. The magnetic recording medium substrate according to claim 2, which is comprised of glass having a fracture toughness value of equal to or greater than 0.9 $MPa \cdot m^{1/2}$.

13. The magnetic recording medium substrate according to claim 9, which is comprised of chemically strengthened glass in which a tensile stress distribution is convex in shape such that the convex shape does not contain indentations indenting to a compressive stress side in a stress profile in a virtual cross section perpendicular to two main surfaces as obtained by the Babinet method.

14. The magnetic recording medium substrate according to claim 10, which is comprised of chemically strengthened glass in which a tensile stress distribution is convex in shape such that the convex shape does not contain indentations indenting to a compressive stress side in a stress profile in a virtual cross section perpendicular to two main surfaces as obtained by the Babinet method.

15. The magnetic recording medium substrate according to claim 9, which is comprised of chemically strengthened glass in which an average value Tav of a tensile stress obtained by the Babinet method and a maximum value Tmax of the tensile stress satisfy the following expression (1):

$$Tav/Tmax \geq 0.5.$$

16. The magnetic recording medium substrate according to claim 10, which is comprised of chemically strengthened glass in which an average value Tav of a tensile stress obtained by the Babinet method and a maximum value Tmax of the tensile stress satisfy the following expression (1):

$$Tav/Tmax \geq 0.5.$$

17. A magnetic recording medium, which comprises a magnetic recording layer on the magnetic recording medium substrate according to claim 7.

18. A magnetic recording medium, which comprises a magnetic recording layer on the magnetic recording medium substrate according to claim 8.

19. A magnetic recording apparatus of energy-assisted magnetic recording system, which comprises:
   a heat-assisted magnetic recording head having a heat source to heat at least a main surface of a magnetic recording medium, a recording element member, and
   a reproduction element member; and
   the magnetic recording medium according to claim 17.

20. A magnetic recording apparatus of energy-assisted magnetic recording system, which comprises:
   a heat-assisted magnetic recording head having a heat source to heat at least a main surface of a magnetic recording medium, a recording element member, and
   a reproduction element member; and
   the magnetic recording medium according to claim 18.

* * * * *